United States Patent
Wang et al.

(10) Patent No.: US 12,149,435 B2
(45) Date of Patent: Nov. 19, 2024

(54) ROUTE SENDING METHOD AND APPARATUS, ROUTE PROCESSING METHOD AND APPARATUS, DEVICE, AND STORAGE MEDIUM

(71) Applicant: HUAWEI TECHNOLOGIES CO., LTD., Shenzhen (CN)

(72) Inventors: Haibo Wang, Beijing (CN); Shunwan Zhuang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/957,922

(22) Filed: Sep. 30, 2022

(65) Prior Publication Data
US 2023/0024814 A1 Jan. 26, 2023

Related U.S. Application Data

(63) Continuation of application No. PCT/CN2021/079932, filed on Mar. 10, 2021.

(30) Foreign Application Priority Data

Mar. 30, 2020 (CN) .......................... 202010239671.9
Jun. 9, 2020 (CN) .......................... 202010519661.0

(51) Int. Cl.
*H04L 45/00* (2022.01)
*H04L 45/745* (2022.01)

(52) U.S. Cl.
CPC ............ *H04L 45/22* (2013.01); *H04L 45/566* (2013.01); *H04L 45/745* (2013.01)

(58) Field of Classification Search
CPC ...... H04L 45/22; H04L 45/566; H04L 45/745
See application file for complete search history.

(56) References Cited

U.S. PATENT DOCUMENTS

| 10,601,699 B2 * | 3/2020 | Ferguson | H04L 45/28 |
| 2005/0073958 A1 * | 4/2005 | Atlas | H04L 45/22 |
| | | | 370/238 |

(Continued)

FOREIGN PATENT DOCUMENTS

| CN | 108243102 A | 7/2018 |
| CN | 109672619 A | 4/2019 |

(Continued)

OTHER PUBLICATIONS https://www.cbtnuggets.com/blog/technology/networking/networking-basics-what-is-ipv4-subnetting (Year: 2018).*

*Primary Examiner* — Glenton B Burgess
*Assistant Examiner* — Jihad K Boustany
(74) *Attorney, Agent, or Firm* — Leydig, Voit & Mayer, Ltd.

(57) ABSTRACT

A method and apparatus are provided. The method includes: a first network device sends route information of a destination network device, where the route information includes a destination address of the destination network device, a primary next-hop address, and a backup next-hop address, the primary next-hop address includes a common address of the first network device and a second network device, for example, a loopback address, and the backup next-hop address includes an address of the first network device, for example, an IP address of the first network device. By using this method, when a fault occurs in a connection between the second network device and the destination network device, another network device may directly send a packet to the first network device according to the backup next-hop address, to ensure normal packet forwarding.

19 Claims, 11 Drawing Sheets

(56) References Cited

U.S. PATENT DOCUMENTS

| | | | |
|---|---|---|---|
| 2010/0220656 A1* | 9/2010 | Ramankutty | H04L 45/22 370/328 |
| 2015/0006757 A1* | 1/2015 | Boutros | H04L 45/14 709/242 |
| 2015/0092539 A1* | 4/2015 | Sivabalan | H04L 45/28 370/225 |
| 2016/0142284 A1* | 5/2016 | Ma | H04L 45/50 370/225 |
| 2016/0191374 A1* | 6/2016 | Singh | H04L 45/22 370/228 |
| 2019/0028577 A1* | 1/2019 | D?Souza | H04L 69/40 |
| 2020/0021523 A1 | 1/2020 | Wang et al. | |
| 2020/0067731 A1* | 2/2020 | Fu | H04L 47/125 |

FOREIGN PATENT DOCUMENTS

| | | | |
|---|---|---|---|
| EP | 3041178 A1 * | 7/2016 | H04L 12/4641 |
| JP | 2019536366 A | 12/2019 | |
| WO | 2019076295 A1 | 4/2019 | |

* cited by examiner

A first network device sends first route information of a destination network device, where the first route information includes a first destination address, a first primary next-hop address, and a first backup next-hop address, the first destination address includes an address of the destination network device, the first primary next-hop address includes a shared address of a first network device and a second network device, and the first backup next-hop address includes an address of the first network device       901

FIG. 9

A second network device receives first route information of a destination network device sent by a first network device, and then generates forwarding information base entries       1001

FIG. 10

A third network device receives first route information of a destination network device from a first network device, and receives second route information of the destination network device from a second network device       1101

The third network device sends, based on the received first route information and the received second route information, a first packet to the destination network device by using a shared address of the first network device and the second network device as a next-hop address       1102

FIG. 11

ROUTE SENDING METHOD AND APPARATUS, ROUTE PROCESSING METHOD AND APPARATUS, DEVICE, AND STORAGE MEDIUM

CROSS-REFERENCE TO RELATED APPLICATIONS

This application is a continuation of International Application No. PCT/CN2021/079932, filed on Mar. 10, 2021, which claims priority to Chinese Patent Application No. 202010239671.9, field on Mar. 30, 2020 and Chinese Patent Application No. 202010519661.0, filed on Jun. 9, 2020. All of the aforementioned patent applications are hereby incorporated by reference in their entireties.

TECHNICAL FIELD

Embodiments of this application pertain to the field of communication technologies, and in particular, to a route sending method and apparatus, a route processing method and apparatus, a device, and a storage medium.

BACKGROUND

The virtual private network (VPN) technology is widely used in network design of major providers. A VPN includes a plurality of provider edge (PE) devices, and the plurality of PE devices are connected to each other. A customer edge (CE) device may be connected to the PE device in the VPN, to access the VPN.

Currently, dual-homing is applied to improve reliability. To be specific, as shown in FIG. 1, a CE1 device is dual-homed to a PE1 device and a PE2 device. A PE3 device is a peer of the PE1 device and the PE2 device, and a CE2 device is connected to the PE3 device. The PE1 device and the PE2 device are used as a pair of dual-homing PE devices, and a same loopback address may be deployed as a common address in manners such as anycast. The PE1 device and the PE2 device may use the common address as next-hop addresses and advertise routes.

After receiving the routes advertised by the PE1 device and the PE2 device, the PE3 device generates forwarding information base entries. In this way, when forwarding traffic sent by the CE2 device to the CE1 device, the PE3 device may search for a route or a tunnel by using the common address, to implement traffic balancing for the PE1 device and the PE2 device. In the foregoing manner, when a fault occurs on a link between the CE1 device and the PE1 device, an update is needed to use the PE2 device to carry the traffic. However, because the common address is used by the PE1 device and the PE2 device, even if the PE1 device withdraws the route, a next-hop in the forwarding information base entries is still the common address. Therefore, the PE3 device still forwards the traffic to the PE1 device. After the traffic reaches the PE1 device, the PE1 device needs to search for a backup next-hop in the local forwarding information base entries when the PE1 device is faulty. However, the backup next-hop is the common address of the PE2 device. In this case, the PE1 device finds that the next-hop is the common address deployed on the PE1 device. As a result, route computing of the PE1 device is incorrect, and traffic cannot be forwarded properly.

SUMMARY

Embodiments of this application provide a route sending method and apparatus, a route processing method and apparatus, a device, and a storage medium. A route carries both a primary next-hop address and a backup next-hop address, so that normal packet forwarding in a network can be ensured.

According to a first aspect, a route sending method is provided. In this method, a first network device sends first route information of a destination network device, where the first route information includes a first destination address, a first primary next-hop address, and a first backup next-hop address, the first destination address includes an address of the destination network device, the first primary next-hop address includes a common address of the first network device and a second network device, and the first backup next-hop address includes an address of the first network device. For example, the destination network device may be a CE device or user equipment connected to the CE device, and the first network device and the second network device may be two PE devices to which the CE device is dual-homed.

Because the destination network device is dual-homed to the first network device and the second network device, the first network device and the second network device, as a pair of dual-homing network devices, may be deployed with the common address, where the common address may be a loopback address. In this way, traffic load balancing can be implemented. A type of a backup next-hop address may be an Internet Protocol (IP) address, that is, the first backup next-hop address may be an IP address of the first network device. In other cases, a type of the common address or the type of the backup next-hop address may alternatively be another address type. The type of the common address may be different from the type of the backup next-hop address. Alternatively, in some cases, the type of the common address may be the same as the type of the backup next-hop address, but the two types can be distinguished between in a specific manner. For example, specific content or values are different, for example, values of two loopback addresses are different, or distinguishing identifiers are different. The address of the destination network device may be an IP address of the destination network device.

In this embodiment of this application, a destination address in the first route information of the destination network device is a first destination address (that is, the address of the destination network device), and a next-hop address in the first route information includes the first primary next-hop address (that is, the common address of the first network device and the second network device), and also includes the first backup next-hop address (that is, the address of the first network device). In this way, another network device that receives the first route information may store the common address of the first network device and the second network device, and may further store the address of the first network device, so that the another network device can directly forward a packet according to the first backup next-hop address to the first network device when a fault occurs in a connection between the second network device and the destination network device. In this way, a network can run normally.

In a possible implementation, the first primary next-hop address and the first backup next-hop address may be carried in one route. In a possible case, the first primary next-hop address is carried in a first attribute field in a first Border Gateway Protocol (BGP) route, and the first backup next-hop address is carried in a second attribute field in the first BGP route. For example, the first primary next-hop address is carried in a next-hop field of the first BGP route, and the first backup next-hop address is carried in an extended community attribute field of the first BGP route. In this way, a primary next-hop and a backup next-hop are distinguished between by using two different fields. In another possible case, both the first primary next-hop address and the first backup next-hop address may be carried in a same field, and the primary next-hop and the backup next-hop are distinguished between by using an indication-bit. In addition, the indication-bit may be used to indicate a receiver to use the primary next-hop or the backup next-hop for packet forwarding.

The first route information including the first primary next-hop address and the first backup next-hop address is carried in one route sent to another network device, for example, a BGP peer. Therefore, a remote network device that receives the route obtains the primary next-hop and the backup next-hop based on the received information, and determines respective use occasions of the primary next-hop and the backup next-hop based on an existing route learning mechanism.

In another possible implementation, the first route information may alternatively be separately carried in two routes for advertisement. For example, one route carries the address of the destination network device and the first primary next-hop address, and the other route carries the address of the destination network device and the first backup next-hop address. In one case, each of the two routes may carry a flag, so that a network device serving as the receiver can distinguish between the primary address and the backup address. In another case, the flag may not be carried, but the primary address and the backup address are distinguished between based on different features or the like.

Optionally, when sending the first route information of the destination network device, the first network device may send the first route information of the destination network device to the second network device and a third network device. The third network device may be, for example, a remote BGP peer of the first network device.

Optionally, the first network device receives second route information of the destination network device from the second network device, and generates forwarding information base entries, where a destination address in the forwarding information base entries is the address of the destination network device, and a backup next-hop in the forwarding information base entries is the second backup next-hop address. The second route information includes a second destination address, a second primary next-hop address, and a second backup next-hop address, the second destination address includes the address of the destination network device, the second primary next-hop address includes the common address, and the second backup next-hop address includes an address of the second network device.

For a manner of carrying the second primary next-hop address and the second backup next-hop address in a route, refer to the foregoing manner of carrying the first primary next-hop address and the first backup next-hop address in the route.

In this embodiment of this application, after receiving the second route information advertised by the second network device, the first network device may find that both the first network device and the second network device are connected to the destination network device. Therefore, the first network device may learn that the first network device and the second network device are dual-homing devices of the destination network device. The first network device may locally create forwarding information base entries, for example, fast reroute (Fast Reroute, FRR) forwarding information base entries, where a backup next-hop in the forwarding information base entries is the second backup next-hop address. In this way, if a fault occurs in a connection between the first network device and the destination network device, the first network device may directly forward, according to the second backup next-hop address in the forwarding information base entries, that is, according to the address of the second network device, a packet that needs to be sent to the destination network device to the second network device, and then the second network device forwards the packet to the destination network device. This ensures normal packet forwarding.

Optionally, the first network device receives, from the second network device, a route withdrawal message used for withdrawing a route of the destination network device, and then sends third route information of the destination network device according to the route withdrawal message. After receiving the route withdrawal message from the second network device, the first network device may determine that a dual-homing relationship between the first network device and the second network device no longer exists. In this case, the first network device may update a route advertised by the first network device, that is, may send the third route information of the destination network device.

The third route information includes the first destination address, and the third route information is used to indicate the third network device to use the first backup next-hop address as a next-hop address for reaching the destination network device. In a possible indication manner, for example, the third route information may include only the first backup next-hop address (that is, the address of the first network device), but does not include the first primary next-hop address. For example, the third route information includes the first backup next-hop address, and the first backup next-hop address is carried in a next-hop field of the third route information. In this way, the remote third network device that receives the third route information may determine, based on a situation that the third route information includes only the first backup next-hop address, that the first backup next-hop address should be used as the next-hop address for reaching the destination network device, and the third network device does not use the first primary next-hop address, that is, does not use the common address of the first network device and the second network device as the next-hop. In another possible indication manner, for example, the third route information may include both the first backup next-hop address and the first primary next-hop address, but an indication-bit indicates that the first primary next-hop address is currently unavailable by using the indication-bit. In this case, the remote third network device that receives the third route information may determine, based on the situation that the first primary next-hop address is unavailable and the first backup next-hop address is available, that the first backup next-hop address should be used as the next-hop address for reaching the destination network device.

Optionally, after receiving the route withdrawal message sent by the second network device, the first network device learns that the destination network device cannot be reached through the second network device in this case. Therefore, the first network device may further delete the second backup next-hop address in the local forwarding information base entries (for example, the FRR entries) based on the route withdrawal message, to avoid a situation that the packet to be sent to the destination network device fails to reach the destination network device caused by forwarding the packet to the second network device. In this way, robustness of network running is ensured.

Optionally, after the first network device sends the first route information or the third route information to the third network device, the first network device may receive a packet sent by the third network device to the destination network device. In other words, the first network device may receive a packet that is sent by the third network device and whose destination address is the address of the destination network device. Then the first network device may forward the packet according to the local forwarding information base entries, for example, directly forward the packet to the destination network device, or forward the packet that is to be sent to the destination network device to the second network device due to a fault in a connection between the first network device and the destination network device.

According to a second aspect, a route sending apparatus is provided. The route sending apparatus has a function of implementing the method provided in any one of the first aspect or the optional implementations of the first aspect. The route sending apparatus includes at least one module, and the at least one module is configured to implement the route sending method provided in any one of the first aspect or the optional implementations of the first aspect. The at least one module may be a software module, a hardware module, or a module combining software and hardware.

According to a third aspect, a network device is provided, where the network device includes a processor configured to execute a computer program to implement the route sending method provided in any one of the first aspect or the optional implementations of the first aspect. The network device may further include a memory that stores the computer program and data that is used to implement the route sending method in any one of the first aspect or the optional implementations of the first aspect. The network device may further include a transceiver configured to receive or send data used to implement the route sending method provided in any one of the first aspect or the optional implementations of the first aspect.

According to a fourth aspect, a computer-readable storage medium is provided, where the computer-readable storage medium stores instructions. When the instructions are run on a computer, the computer is enabled to perform the route sending method in any one of the first aspect or the optional implementations of the first aspect.

According to a fifth aspect, a computer program product including instructions is provided. When the computer program product runs on a computer, the computer is enabled to perform the route sending method in any one of the first aspect or the optional implementations of the first aspect.

Technical effects obtained in the second aspect, the third aspect, the fourth aspect, and the fifth aspect are similar to the technical effects obtained by using corresponding technical means in the first aspect. Details are not described herein again.

According to a sixth aspect, a route processing method is provided. In this method, a third network device receives first route information of a destination network device from a first network device, and receives second route information of the destination network device from a second network device. Then the third network device sends, based on the received first route information and the received second route information, a first packet to the destination network device by using a common address as a next-hop address. For example, the destination network device may be a CE device or user equipment connected to the CE device, and the first network device and the second network device may be two PE devices to which the CE device is dual-homed. The third network device may be a remote PE device, and the remote PE device is connected to the first network device and the second network device by using a BGP protocol.

The first route information includes a first destination address, a first primary next-hop address, and a first backup next-hop address, the first destination address includes an address of the destination network device, the first primary next-hop address includes the common address of the first network device and the second network device, and the first backup next-hop address includes an address of the first network device.

The second route information includes a second destination address, a second primary next-hop address, and a second backup next-hop address, the second destination address includes the address of the destination network device, the second primary next-hop address includes the common address, and the second backup next-hop address includes an address of the second network device.

For types and carrying manners of the common address, the first primary next-hop address, the second primary next-hop address, the first backup next-hop address, and the second backup next-hop address, refer to the corresponding description in the first aspect. Details are not described herein again.

Because both the first route information and the second route information include route information for reaching the destination network device, the third network device determines that two routes of the destination network device are received. In this case, for a packet that needs to be sent to the destination network device, the third network device may forward the packet to the destination network device by using the common address as a next-hop address. In this way, load balancing can be implemented.

To be specific, the third network device may generate forwarding information base entries in the third network device based on the received first route information and the received second route information. A destination address in the forwarding information base entries in the third network device is an address of the destination network device, and a next-hop is the common address. The third network device sends the first packet to the destination network device according to the next-hop in the forwarding information base entries. To be specific, the third network device may use the common address as a next-hop forwarding information base entry used for querying, and send the first packet to the destination network device according to the forwarding information base entry; or the third network device may use the common address as a next-hop recursive tunnel, and send the first packet to the destination network device according to tunnel information of the tunnel. In this case, the third network device sends the first packet to the first network device or the second network device according to a load balancing policy, and the first network device or the second network device forwards the first packet to the destination network device.

In this embodiment of this application, the third network device may receive the first route information of the destination network device sent by the first network device, and receive the second route information of the destination network device sent by the second network device. Destination addresses in both the first route information and the second route information are the address of the destination network device. A next-hop address in the first route information may include the common address, and may further include an address of the first network device. A next-hop address in the second route information may include the common address, and may further include an address of the second network device. In this way, the third network device may store the common address and the addresses of the first network device and the second network device. Therefore, when a fault occurs in a connection between one of the first network device and the second network device and the destination network device, the third network device can directly forward the packet according to the address of the other network device.

Each of the first route information and the second route information may be carried in one route, or the first primary next-hop and the first backup next-hop in the first route information may be carried in two routes respectively, and the second primary next-hop and the second backup next-hop in the second route information may be carried in two routes respectively. For a specific implementation, refer to the related description in the first aspect.

In a possible implementation, the third network device receives, from the second network device, a route withdrawal message used for withdrawing a route of the destination network device. The route withdrawal message is used to withdraw a route that reaches the destination network device. Based on the route withdrawal message, the third network device learns that the packet cannot be forwarded to the destination network device through the second network device, and therefore sends a second packet to the destination network device by using the first backup next-hop address.

To be specific, when receiving the route withdrawal message from the second network device, the third network device may update the forwarding information base entries based on the route withdrawal message. The destination address in the forwarding information base entries is the address of the destination network device, and the next-hop in the forwarding information base entries is the address of the first network device, for example, an IP address of the first network device. That is, in this case, the third network device sends the second packet to the destination network device not according to the common address of the first network device and the second network device. In this case, the third network device forwards the second packet to the first network device, and the first network device forwards the second packet to the destination network device. In this way, normal pack forwarding can be endured.

In another possible implementation, the third network device receives third route information of the destination network device from the first network device, where the third route information is used to indicate the third network device to use the first backup next-hop address as a next-hop address for reaching the destination network device. Then the third network device sends the second packet to the destination network device based on the third route information by using the first backup next-hop address. The third route information is sent by the first network device after receiving the route withdrawal message sent by the second network device.

To be specific, when receiving the third route information of the destination network device from the first network device, the third network device may update the forwarding information base entries based on the third route information. The destination address in the forwarding information base entries is the address of the destination network device, and the next-hop in the forwarding information base entries is the address of the first network device. Similar to the first manner, the third network device forwards the second packet to the first network device, and the first network device forwards the second packet to the destination network device. In this way, normal pack forwarding can be endured. For a manner of advertising the third route information, refer to the corresponding description in the first aspect. Details are not described herein again.

After receiving the route withdrawal message sent by the second network device or the third route information sent by the first network device, the third network device can determine that the packet can be sent to the destination network device only through the first network device. Therefore, the third network device directly uses the address of the first network device, for example, the IP address, to forward the packet that needs to be sent to the destination network device, instead of using the common address. In this way, normal service running is ensured. It may be understood that, in one case, the third network device supports both route learning and route withdrawal, and the third network device may forward, based on either of the received route withdrawal message and the received third route information, the packet by using the address of the first network device as a next-hop. In another case, the third network device may not support route withdrawal. In this case, the third network device may learn a route at least according to the received third route information, to ensure that the third network device can forward the packet by using the address of the first network device as a next-hop when a fault occurs in a connection between the second network device and the destination network device. That is, two manners, which are sending the route withdrawal message and sending the third route information, are provided for a network. Therefore, even if the third network device does not support route withdrawal, the third network device can determine, at least by learning a route, an occasion for forwarding the packet by using the address of the first network device. As a result, universality and robustness of a network operation mechanism is improved.

According to a seventh aspect, a route processing apparatus is provided. The route processing apparatus has a function of implementing the method provided in any one of the sixth aspect or the optional implementations of the sixth aspect. The route processing apparatus includes at least one module, and the at least one module is configured to implement the route processing method provided in any one of the sixth aspect or the optional implementations of the sixth aspect. The at least one module may be a software module, a hardware module, or a module combining software and hardware.

According to an eighth aspect, a network device is provided, where the network device includes a processor configured to execute a computer program to implement the route processing method provided in any one of the sixth aspect or the optional implementations of the sixth aspect. The network device may further include a memory that stores the computer program and data that is used to implement the route processing method in any one of the sixth aspect or the optional implementations of the sixth aspect. The network device may further include a transceiver configured to receive or send data used to implement the route processing method in any one of the sixth aspect or the optional implementations of the sixth aspect.

According to a ninth aspect, a computer-readable storage medium is provided, where the computer-readable storage medium stores instructions. When the instructions are run on a computer, the computer is enabled to perform the route processing method in any one of the sixth aspect or the optional implementations of the sixth aspect.

According to a tenth aspect, a computer program product including instructions is provided. When the computer program product runs on a computer, the computer is enabled to perform the route processing method in any one of the sixth aspect or the optional implementations of the sixth aspect.

Technical effects obtained in the seventh aspect, the eighth aspect, the ninth aspect, and the tenth aspect are similar to the technical effects obtained by using corresponding technical means in the sixth aspect. Details are not described herein again.

According to an eleventh aspect, a route processing method is provided. In this method, a second network device receives first route information of a destination network device sent by a first network device, and generates forwarding information base entries, where a destination address in the forwarding information base entries is an address of the destination network device, and a backup next-hop in the forwarding information base entries is a first backup next-hop address.

The first route information includes a first destination address, a first primary next-hop address, and a first backup next-hop address, the first destination address includes the address of the destination network device, a first primary next-hop address includes a common address of the first network device and the second network device, and the first backup next-hop address includes an address of the first network device.

In this embodiment of this application, if a fault occurs in a connection between the second network device and the destination network device, the second network device may directly forward, according to a backup next-hop address in the forwarding information base entries (for example, FRR forwarding information base entries), that is, according to the address of the first network device, a packet that needs to be sent to the destination network device to the first network device, and then the first network device forwards the packet to the destination network device. This ensures normal packet forwarding.

Optionally, the second network device may send the second route information of the destination network device, for example, the second network device may send the second route information of the destination network device to the first network device and a third network device. The third network device may be, for example, a BGP peer of the second network device, for example, a remote PE device.

The second route information includes a second destination address, a second primary next-hop address, and a second backup next-hop address, the second destination address includes the address of the destination network device, the second primary next-hop address includes the common address, and the second backup next-hop address includes an address of the second network device.

For types and carrying manners of the common address, the second primary next-hop address, and the second backup next-hop address, refer to the corresponding description in the first aspect. Details are not described herein again.

Optionally, because a fault occurs in the connection between the second network device and the destination network device, the second network device may send a route withdrawal message used for withdrawing a route of the destination network device to the first network device and the third network device.

The route withdrawal message is used to indicate that a previously advertised route is unreachable. For the second network device, the route withdrawal message sent by the second network device is used for withdrawing the second route information of the destination network device that is previously sent, for example, indicating that the second route information needs to be deleted.

The fault in the connection between the second network device and the destination network device may include an interface fault of the second network device, a fault on a link between the second network device and the destination network device, and the like. When a fault occurs in the connection between the second network device and the destination network device, a packet transmission path between the second network device and the destination network device is faulty. Therefore, the second network device may send the route withdrawal message to withdraw the second route information that is previously sent.

In a possible case, after receiving the route withdrawal message, the first network device that is in a dual-homing relationship with the second network device may delete or temporarily shield information about the backup next-hop in the local forwarding information base entries based on the route withdrawal message, where the information about the backup next-hop is an address of the second network device, for example, an IP address. After receiving the route withdrawal message, the remote third network device may determine, based on the route withdrawal message, that the packet cannot be forwarded to the destination network device through the second network device. Therefore, the remote third network device uses the address of the first network device, for example, the IP address, to forward the packet that should be sent to the destination network device. In this way, normal service operation can be ensured.

In addition, the third network device determines, through route withdrawal or route learning, that a fault occurs in the connection between the second network device and the destination network device, but before forwarding the packet by using the address of the first network device, it is still possible to forward the packet by using the common address of the first network device and the second network device within a period of time. Therefore, when a fault occurs in the connection between the second network device and the destination network device, the second network device may still receive the packet sent by the third network device to the destination network device. In this case, the second network device forwards the packet to the first network device according to the backup next-hop in the local forwarding information base entries, and the first network device forwards the packet to the destination network device. In this way, normal pack forwarding can be endured.

According to a twelfth aspect, a route processing apparatus is provided. The route processing apparatus has a function of implementing the method provided in any one of the eleventh aspect or the optional implementations of the eleventh aspect. The route processing apparatus includes at least one module, and the at least one module is configured to implement the route sending method provided in any one of the eleventh aspect or the optional implementations of the eleventh aspect. The at least one module may be a software module, a hardware module, or a module combining software and hardware.

According to a thirteenth aspect, a network device is provided, where the network device includes a processor configured to execute a computer program to implement the route sending method provided in any one of the eleventh aspect or the optional implementations of the eleventh aspect. The network device may further include a memory that stores the computer program and data that is used to implement the route sending method in any one of the eleventh aspect or the optional implementations of the eleventh aspect. The network device may further include a transceiver configured to receive or send data used to implement the route sending method provided in any one of the eleventh aspect or the optional implementations of the eleventh aspect.

According to a fourteenth aspect, a computer-readable storage medium is provided, where the computer-readable storage medium stores instructions. When the instructions are run on a computer, the computer is enabled to perform the route processing method in the eleventh aspect.

According to a fifteenth aspect, a computer program product including instructions is provided. When the computer program product runs on a computer, the computer is enabled to perform the route processing method in the eleventh aspect.

Technical effects obtained in the twelfth aspect, the thirteenth aspect, the fourteenth aspect, and the fifteenth aspect are similar to technical effects obtained by using corresponding technical means in the eleventh aspect. Details are not described herein again.

BRIEF DESCRIPTION OF DRAWINGS

FIG. 9 is a flowchart of a route sending method, according to an embodiment of this application;

FIG. 10 is a flowchart of a route processing method, according to an embodiment of this application;

FIG. 11 is a flowchart of another route processing method, according to an embodiment of this application;

DESCRIPTION OF EMBODIMENTS

Figure 1:
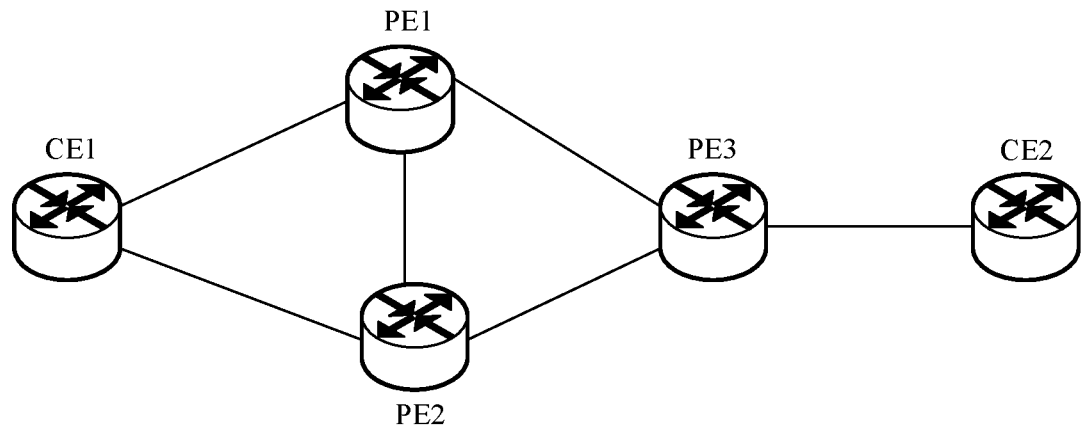
FIG. 1 is a schematic diagram of a network system, according to an embodiment of this application.

To make objectives, technical solutions, and advantages of embodiments of this application clearer, the following further describes implementations of this application in detail with reference to accompanying drawings.

It should be understood that "a plurality of" mentioned in embodiments of this application means two or more. In the descriptions of embodiments of this application, "/" means "or" unless otherwise specified. For example, A/B may represent A or B. In this specification, "and/or" describes only an association relationship between associated objects and represents that three relationships may exist. For example, A and/or B may represent the following three cases: Only A exists, both A and B exist, and only B exists. In addition, for convenience of clear description of the technical solutions in the embodiments of this application, terms such as "first" and "second" are used to distinguish between same objects or similar objects whose functions and purposes are basically the same. A person skilled in the art may understand that the terms such as "first" and "second" do not limit a quantity and an execution sequence, and the terms such as "first" and "second" do not indicate a definite difference.

Before embodiments of this application are described in detail, an application scenario related to embodiments of this application is described.

A network system in embodiments of this application includes a first network device and a second network device that are connected to a destination network device. The destination network device is a network device that receives service traffic through the first network device and the second network device. The destination network device may be directly connected to the first network device and the second network device. For example, the destination network device may be a CE device, and the CE device is dual-homed to the first network device and the second network device serving as PE devices. Alternatively, the destination network device may be indirectly connected to the first network device and the second network device. For example, the destination network device is user equipment connected to the CE device. Traffic sent to the user equipment may be sent to the CE device through the first network device or the second network device, and is forwarded by the CE device to the user equipment. The network system may further include a third network device. The third network device is connected to the first network device and the second network device. For example, the third network device may also be a PE device, and serve as a Border Gateway Protocol (BGP) peer of the first network device and the second network device.

The first network device, the second network device, and the third network device may be devices having a data forwarding function, for example, may be switches or routers. The destination network device may be a device having a data forwarding function, or may be a user terminal device. Types of the destination network device, the first network device, the second network device, and the third network device may be the same or may be different.

The schematic diagram of the network system shown in FIG. 1 is still used as an example. The following uses an example in which a destination network device is the CE1 device, a first network device is the PE1 device, a second network device is the PE2 device, and a third network device is the PE3 device for description.

The network system shown in FIG. 1 may be used as an application scenario according to an embodiment of this application. Refer to FIG. 1. The network system includes the PE1 device and the PE2 device that are connected to the CE1 device. That is, the CE1 device is dual-homed to the PE1 device and the PE2 device. The PE1 device and the PE2 device are BGP peers. The network system further includes the PE3 device, and the PE3 device is a BGP peer of the PE1 device and the PE2 device. Another CE device (for example, a CE2 device shown in FIG. 1) may be connected to the PE3 device.

The PE1 device may send first route information of the CE1 device to peers of the PE1 device, including the PE2 device and the PE3 device. The PE2 device may send second route information of the CE1 device to peers of the PE2 device, including the PE1 device and the PE3 device. The route information of the CE1 device may be used to indicate a packet transmission path to the CE1 device, that is, the packet transmission path to the CE1 device may be determined by receiving the route information of the CE1 device. The route information of the CE1 device may include a destination address and a next-hop address. A destination address in the first route information is an address of the CE1 device, and a next-hop address is an address of the PE1 device. A destination address in the second route information is also the address of the CE1 device, and a next-hop address is an address of the PE2 device.

It may be understood that, in the foregoing scenario, an example in which the destination network device is the CE1 device is used. Therefore, the destination address carried in the route information is the address of the CE device, and may be specifically an Internet Protocol (IP) address. In another possible application scenario, the destination network device may alternatively be another device connected to the CE1 device, for example, a user-side network device or a user host. When the destination network device is the user-side network device, the destination address may be an IP address of the user-side network device. When the destination network device is the user host, the destination address may be an IP address of a specific user host, or may be a route prefix, where the route prefix is a network segment address covering some or all of a plurality of user hosts and the plurality of user hosts are connected to the CE1 device.

When receiving a packet sent by the CE2 device to the CE1 device, the PE3 device may forward the packet to the PE1 device and the PE2 device via corresponding packet transmission paths based on the received first route information and the received second route information. After receiving the packet sent by the PE3 device to the CE1 device, the PE1 device may forward the packet to the CE1 device via a packet transmission path. Similarly, after receiving the packet sent by the PE3 device to the CE1 device, the PE2 device may forward the packet to the CE1 device via a packet transmission path.

In a possible implementation, the PE1 device and the PE2 device are used as dual-homing PEs. When advertising the route information, the PE1 device and the PE2 device may use a common address, for example, a same loopback address, as a next-hop in the route information, so that the PE3 device that receives the route information implements traffic load balancing according to the same address. In the manner described above, when a fault occurs on a link between the CE1 device and the PE1 device, the PE3 device still forwards traffic to the PE1 device, which results in exception in route calculation of the PE1 device. As a result, packet forwarding is affected.

Therefore, embodiments of this application provide a route sending method and a route processing method. The corresponding methods can be applied to the network system shown in FIG. 1, to resolve a problem that a packet cannot be forwarded when a network device uses a common address to advertise a route.

The following describes route advertisement processes in a route sending method and a route processing method.

Figure 2:
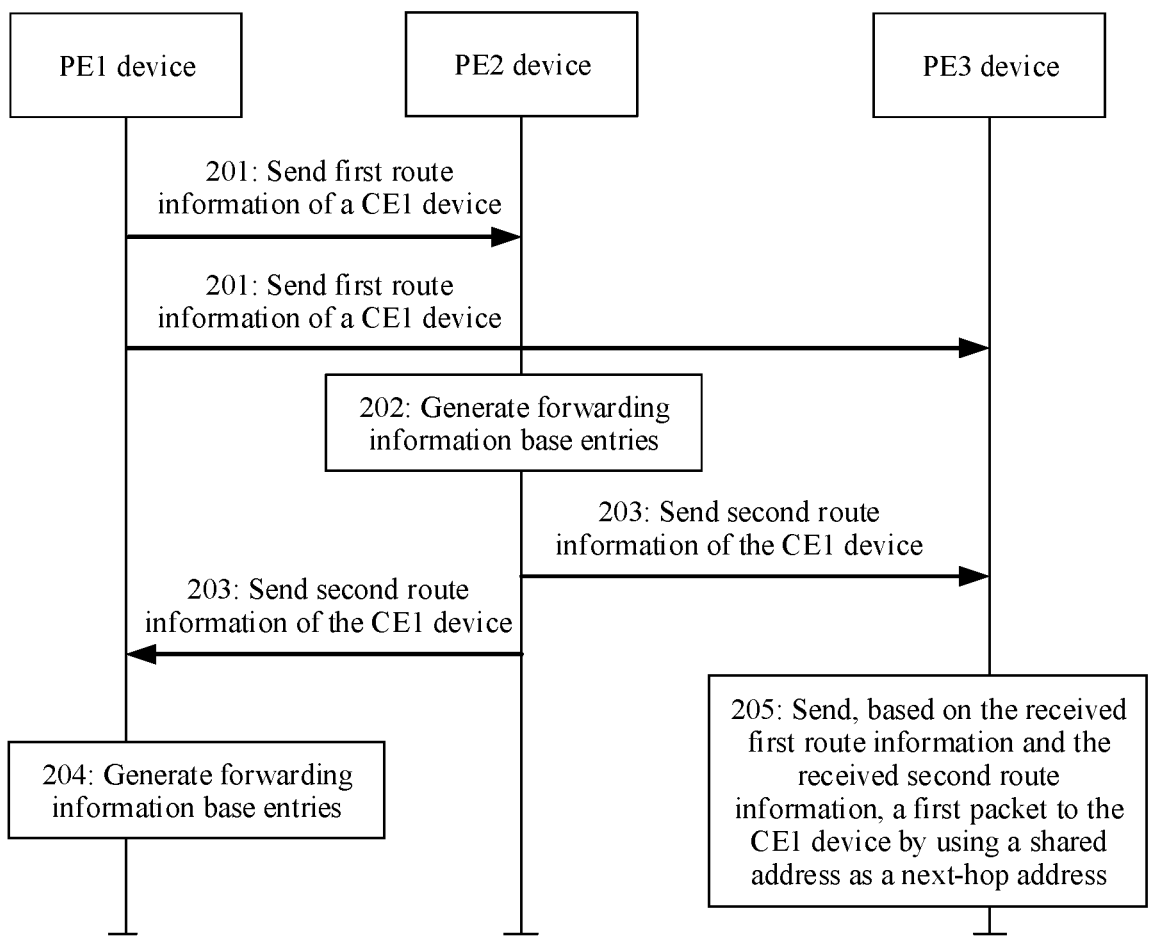
FIG. 2 is a flowchart of a route advertisement process, according to an embodiment of this application.

FIG. 2 is a flowchart of a route advertisement process according to an embodiment of this application. Refer to FIG. 2. The process includes the following steps.

201: A PE1 device sends first route information of a CE1 device.

The first route information includes a first destination address, a first primary next-hop address, and a first backup next-hop address, where the first destination address includes an address of the CE1 device, the first primary next-hop address includes a common address of the PE1 device and a PE2 device, and the first backup next-hop address includes the address of the PE1 device.

Because the CE1 device is dual-homed to the PE1 device and the PE2 device, the PE1 device and the PE2 device, as a pair of dual-homing network devices, may be deployed with the common address, where the common address may be a loopback address. A type of a backup next-hop address may be an IP address, that is, the first backup next-hop address may be an IP address of the PE1 device. In other cases, a type of the common address or the type of the backup next-hop address may alternatively be another address type. The type of the common address may be different from the type of the backup next-hop address. Alternatively, in some cases, the type of the common address may be the same as the type of the backup next-hop address, but the two types can be distinguished between in a specific manner, for example, specific content or values are different, or distinguishing identifiers are different. The address of the CE1 device may be an IP address of the CE1 device.

In this embodiment of this application, a destination address in the first route information of the CE1 device is the first destination address (that is, the address of the CE1 device), and a next-hop address in the first route information includes the first primary next-hop address (that is, the common address of the PE1 device and the PE2 device), and further includes the first backup next-hop address (that is, the address of the PE1 device). In this way, another network device that receives the first route information may store the common address of the PE1 device and the PE2 device, and may further store the address of the PE1 device, so that the another network device can directly forward a packet according to the first backup next-hop address when a fault occurs in a connection between the PE2 device and the CE1 device.

In a possible case, the first route information may be carried in one route or two routes for sending. An example in which a route type is a BGP route is used in the following descriptions.

For example, if the first route information is carried in one BGP route, the first destination address may be carried in a destination address field of a first BGP route. In one manner, the first primary next-hop address and the first backup next-hop address may be carried in different attribute fields. To be specific, the first primary next-hop address is carried in a first attribute field of the first BGP route, and the first backup next-hop address is carried in a second attribute field of the first BGP route. For example, the first primary next-hop address is carried in a next-hop field of the first BGP route, and the first backup next-hop address is carried in an extended community attribute field of the first BGP route. In this way, a primary next-hop and a backup next-hop are distinguished between by using two different fields. Alternatively, in another manner, both the first primary next-hop address and the first backup next-hop address may be carried in a same field, and the primary next-hop and the backup next-hop are distinguished between by using an indication-bit. In some cases, the indication-bit may be used to indicate a receiver to use the primary next-hop or the backup next-hop for packet forwarding.

For example, if the first route information is carried in two BGP routes, the first destination address may be carried in destination address fields of the two BGP routes. The first primary next-hop address may be carried in a next-hop field of one BGP route, and the first backup next-hop address may be carried in a next-hop field of another BGP route. In this case, an indication-bit may be added to the two BGP routes to indicate the primary next-hop and the backup next-hop. The indication-bit may include one bit, or may include a plurality of bits. When the indication-bit includes one bit, the primary next-hop and the backup next-hop may be distinguished between by setting the bit to 0 or 1. When the indication-bit includes a plurality of bits, the primary next-hop and the backup next-hop may be distinguished between by using different priority values.

When sending the first route information of the CE1 device, the PE1 device may send the first route information of the CE1 device to a peer of the PE1 device, for example, may send the first route information of the CE1 device to the PE2 device and a PE3 device.

202: The PE2 device receives the first route information of the CE1 device from the PE1 device, and generates forwarding information base entries.

A destination address in the forwarding information base entries is the address of the CE1 device, and a backup next-hop in the forwarding information base entries is the first backup next-hop address.

In a layer 3 forwarding scenario, after receiving the first route information of the CE1 device from the PE1 device, the PE2 device may determine that the PE2 device is in a dual-homing relationship with the PE1 device, that is, may determine that the CE1 device is dual-homed to the PE2 device and the PE1 device. In a layer 2 forwarding scenario, when the PE2 device and the PE1 device have a same Ethernet segment identifier (ESI), the PE2 device may determine that the PE2 device and the PE1 device are in a dual-homing relationship.

When determining that the PE2 device is in the dual-homing relationship with the PE1 device, the PE2 device may directly generate the forwarding information base entries according to the first backup next-hop address in the first route information of the CE1 device sent by the PE1 device, that is, may directly generate the forwarding information base entries according to the address of the PE1 device. To be specific, the destination address in the forwarding information base entries is the address of the CE1 device, a primary next-hop in the forwarding information base entries is the address of the CE1 device, and a backup next-hop in the forwarding information base entries is the address of the PE1 device. The forwarding information base entries may be used to guide packet forwarding when a fault occurs on a link between the CE1 device and the PE2 device. The forwarding information base entries may be fast reroute (FRR) entries or the like.

In this embodiment of this application, if a fault occurs in the connection between the PE2 device and the CE1 device, the PE2 device may directly forward, to the PE1 device according to the backup next-hop address in the forwarding information base entries, that is, according to the address of the PE1 device, a packet that needs to be sent to the CE1 device. Then the PE1 device forwards the packet to the CE1 device. In this way, normal packet forwarding is ensured.

The PE2 device may receive the first route information of the CE1 device sent by the PE1 device, and may send second route information of the CE1 device. Details are described in the following operation 203.

203: The PE2 device sends the second route information of the CE1 device.

The second route information includes a second destination address, a second primary next-hop address, and a second backup next-hop address, where a second destination address includes the address of the CE1 device, the second primary next-hop address includes the common address of the PE1 device and the PE2 device, and the second backup next-hop address includes an address of the PE2 device.

In this embodiment of this application, a destination address in the second route information of the CE1 device is the second destination address (that is, the address of the CE1 device), and a next-hop address in the second route information includes a second primary next-hop address (that is, the common address of the PE1 device and the PE2 device), and further includes a second backup next-hop address (that is, the address of the PE2 device). In this way, another network device that receives the second route information may store the common address of the PE1 device and the PE2 device, and may further store the address of the PE2 device, so that the another network device can directly forward a packet according to the second backup next-hop address when a fault occurs in a connection between the PE1 device and the CE1 device. Both the address of the CE1 device and the backup next-hop address of the PE2 device may be IP addresses, or may be other addresses other than the common address.

In a possible case, the second route information may be carried in one route or two routes for sending. An example in which a route type is a BGP route is used in the following descriptions.

For example, if the second route information is carried in one BGP route, the second destination address may be carried in a destination address field of a second BGP route. In one manner, the second primary next-hop address and the second backup next-hop address may be carried in different attribute fields. To be specific, the second primary next-hop address is carried in a third attribute field of the second BGP route, and the second backup next-hop address is carried in a fourth attribute field of a first BGP route. For example, the second primary next-hop address is carried in a next-hop field of the second BGP route, and the second backup next-hop address is carried in an extended community attribute field of the second BGP route. In this way, a primary next-hop and a backup next-hop are distinguished between by using two different fields. Alternatively, in another manner, as another possible implementation, both the first primary next-hop address and the first backup next-hop address may be carried in a same field, and the primary next-hop and the backup next-hop are distinguished between by adding an indication-bit. In some cases, the indication-bit may be used to indicate a receiver to use the primary next-hop or the backup next-hop for packet forwarding.

For example, if the second route information is carried in two BGP routes, the second destination address may be carried in destination address fields of the two BGP routes. The second primary next-hop address may be carried in a next-hop field of one BGP route, and the second backup next-hop address may be carried in a next-hop field of another BGP route. In this case, an indication-bit may be added to the two BGP routes to indicate the primary next-hop and the backup next-hop. The indication-bit may include one bit, or may include a plurality of bits. When the indication-bit includes one bit, the primary next-hop and the backup next-hop may be distinguished between by setting the bit to 0 or 1. When the indication-bit includes a plurality of bits, the primary next-hop and the backup next-hop may be distinguished between by using different priority values.

When sending the second route information of the CE1 device, the PE2 device may send the second route information of the CE1 device to a peer of the PE2 device, for example, may send the second route information of the CE1 device to the PE1 device and the PE3 device.

204: The PE1 device receives the second route information of the CE1 device from the PE2 device, and generates forwarding information base entries.

For a process in which the PE1 device generates the forwarding information base entries in the PE1 device based on the second route information, refer to the description of generating, by the PE2 device, the forwarding information base entries in the PE2 device based on the first route information in 202. Details are not described herein again.

205: The PE3 device receives the first route information of the CE1 device from the PE1 device, receives the second route information of the CE1 device from the PE2 device, and sends a first packet to the CE1 device based on the received first route information and the received second route information, where the common address is used as a next-hop address.

Because both the first route information and the second route information are route information of the CE1 device, the PE3 device determines that two routes of the CE1 device are received. In this case, for the first packet that needs to be sent to the CE1 device, the PE3 device may send the first packet to the CE1 device by using the common address as the next-hop address.

To be specific, the PE3 device may generate forwarding information base entries in the PE3 device based on the received first route information and the received second route information. A destination address in the forwarding information base entries in the PE3 device is the address of the CE1 device, and a next-hop is the common address. The PE3 device sends the first packet to the CE1 device according to the next-hop in the forwarding information base entries. To be specific, the PE3 device may search for an interface and forward the packet according to the common address, or the PE3 device may perform tunnel recursion according to the common address, to determine corresponding tunnel information to forward the packet. In this case, the PE3 device sends the first packet to the PE1 device or the PE2 device according to a load balancing policy, and the PE1 device or the PE2 device forwards the first packet to the CE1 device.

In this embodiment of this application, the PE3 device may receive the first route information of the CE1 device sent by the PE1 device, and receive the second route information of the CE1 device sent by the PE2 device. The destination addresses in both the first route information and the second route information are the address of the CE1 device. The next-hop address in the first route information may include the common address, and may further include the address of the PE1 device. The next-hop address in the second route information may include the common address, and may further include the address of the PE2 device. In this way, the PE3 device may store the common address and the addresses of the PE1 device and the PE2 device. Therefore, when a fault occurs in a connection between one of the PE1 device and the PE2 device and the CE1 device, the PE3 device can directly forward the packet according to the address of the other PE device.

The following describes route withdrawal processes in a route sending method and a route processing method.

Figure 3:
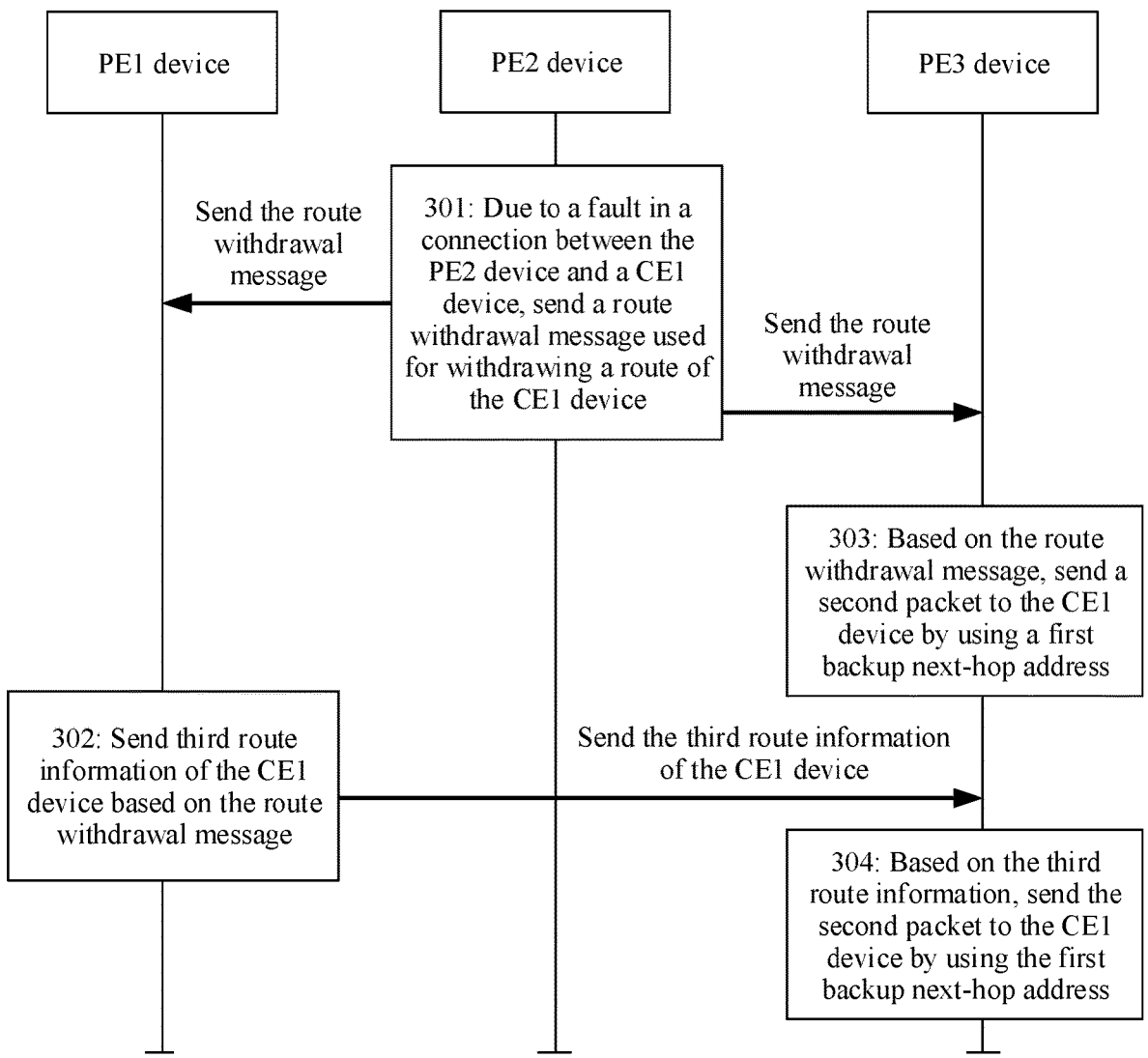
FIG. 3 is a flowchart of a route withdrawal process, according to an embodiment of this application.

FIG. 3 is a flowchart of a route withdrawal process according to an embodiment of this application. Refer to FIG. 3. The process includes the following steps.

301: Due to a fault in a connection between a PE2 device and a CE1 device, the PE2 device sends a route withdrawal message to withdraw a route of the CE1 device to each of a PE1 device and a PE3 device.

The route withdrawal message is used to indicate that a previously advertised route is unreachable. For the PE2 device, the route withdrawal message sent by the PE2 device is used for withdrawing second route information of the CE1 device that is previously sent, that is, indicates that the second route information needs to be deleted.

A fault in the connection between the PE2 device and the CE1 device may include an interface fault of the PE2 device, a fault on a link between the PE2 device and the CE1 device, and the like. When a fault occurs in the connection between the PE2 device and the CE1 device, a packet transmission path between the PE2 device and the CE1 device is faulty. Therefore, the PE2 device may send the route withdrawal message to withdraw the second route information that is previously sent.

302: The PE1 device receives, from the PE2 device, the route withdrawal message used for withdrawing the route of the CE1 device, and sends third route information of the CE1 device based on the route withdrawal message.

The third route information carries a first backup next-hop address, that is, an address of the PE1 device, and the third route information is used to indicate the PE3 device to use the first backup next-hop address as a next-hop address for reaching the CE1 device.

After receiving the route withdrawal message from the PE2 device, the PE1 device may determine that a dual-homing relationship between the PE1 device and the PE2 device no longer exists. In this case, the PE1 device may update a route advertised by the PE1 device, that is, may send the third route information of the CE1 device.

In an example, the third route information may include a first destination address and the first backup next-hop address, and no longer carry the first primary next-hop address, that is, a common address of the PE1 device and the PE2 device. The first backup next-hop address may be carried in a next-hop field of the third route information. For example, if the third route information is carried in a BGP route, the first destination address may be carried in a destination address field of the BGP route. The first backup next-hop address may be carried in a next-hop field of the BGP route.

In another example, the third route information may still include the first destination address, the first backup next-hop address, and the first primary next-hop address, but an indication-bit indicates that the first primary next-hop address is unavailable by using the indication-bit. For example, if the third route information is carried in the BGP route, the first destination address may be carried in the destination address field of the BGP route. The first backup next-hop address may be carried in the next-hop field of the BGP route, the first primary next-hop address may be carried in an extended community attribute field of the BGP route, and an indication-bit is added to the extended community attribute field to indicate that the first primary next-hop address is unavailable. Alternatively, both the first backup next-hop address and the first primary next-hop address may be carried in a same attribute field of the BGP route, for example, the next-hop field, which is used together with an indication-bit to indicate that the first primary next-hop address is unavailable, or the first backup next-hop address is preferentially used.

In addition, because the second backup next-hop address in the forwarding information base entries in operation 204 is generated based on the second route information of the CE1 device sent by the PE2 device, after receiving the route withdrawal message sent by the PE2 device, the PE1 device may further update the forwarding information base entries based on the route withdrawal message, for example, delete the second backup next-hop address in the FRR forwarding information base entries for updating.

After the PE1 device sends the first route information or the third route information to the PE3 device, the PE1 device may receive a packet sent by the PE3 device to the CE1 device. In other words, the PE1 device may receive a packet that is sent by the PE3 device and whose destination address is the address of the CE1 device. Then the PE1 device may forward the packet according to local forwarding information base entries.

In an example, a destination address in the local forwarding information base entries is the address of the CE1 device, a primary next-hop in the forwarding information base entries is the address of the CE1 device, and a backup next-hop in the forwarding information base entries is the address of the PE2 device. For a process of generating the local forwarding information base entries, refer to the corresponding descriptions in S204 and S202. In this case, for the packet sent to the CE1 device, the PE1 device may directly forward the packet to the CE1 device according to the primary next-hop in the forwarding information base entries when no fault occurs in a connection between the PE1 device and the CE1 device. Although the case where a fault occurs in the connection between the PE2 device and the CE1 device is used as an example in FIG. 3, it may be understood that a fault may occur in the connection between the PE1 device and the CE1 device. In this case, the PE1 may forward the packet to the PE2 device according to the backup next-hop in the local forwarding information base entries, and the PE2 device forwards the packet to the CE1 device.

In the following descriptions, the case where a fault occurs in the connection between the PE2 device and the CE1 device is still used as an example, and the PE3 may perform the following operation 303 or 304.

303: The PE3 device receives, from the PE2 device, the route withdrawal message used for withdrawing the route of the CE1 device, and sends a second packet to the CE1 device based on the route withdrawal message by using the first backup next-hop address.

To be specific, when receiving the route withdrawal message from the PE2 device, the PE3 device may update forwarding information base entries based on the route withdrawal message. A destination address in the forwarding information base entries is the address of the CE1 device, and a next-hop in the forwarding information base entries is the address of the PE1 device, for example, an IP address of the PE1 device. That is, in this case, the PE3 device sends the second packet to the CE1 device not according to the common address of the PE1 device and the PE2 device. In this case, the PE3 device forwards the second packet to the PE1 device, and the PE1 device forwards the second packet to the CE1 device.

304: The PE3 device receives the third route information of the CE1 device from the PE1 device, and sends the second packet to the CE1 device based on the third route information by using the first backup next-hop address.

To be specific, when receiving the third route information of the CE1 device from the PE1 device, the PE3 device may update the forwarding information base entries based on the third route information. The destination address in the forwarding information base entries is the address of the CE1 device, and the next-hop in the forwarding information base entries is the address of the PE1 device. Similar to 303, the PE3 device forwards the second packet to the PE1 device, and the PE1 device forwards the second packet to the CE1 device.

It should be noted that, in some cases, the PE3 device has a route learning capability but does not have a route withdrawal capability. In the case where the PE3 device does not have the route withdrawal capability, the PE3 device may implement packet forwarding according to the foregoing operation 304, in other words, an occasion for using the backup next-hop to forward the packet can be determined only by route learning. In a case where the PE3 device has the route withdrawal capability, the PE3 device may implement packet forwarding according to any one of the foregoing operations 303 and 304. In addition, when the PE3 device updates the forwarding information base entries based on the received route withdrawal message or the received third route information, one possible manner is to replace the common address in the next-hop information with the first backup next-hop address; and another possible manner is to update a flag to indicate that the common address in the next-hop information is currently unavailable, and the first backup next-hop address needs to be used to forward the packet.

Figure 4:
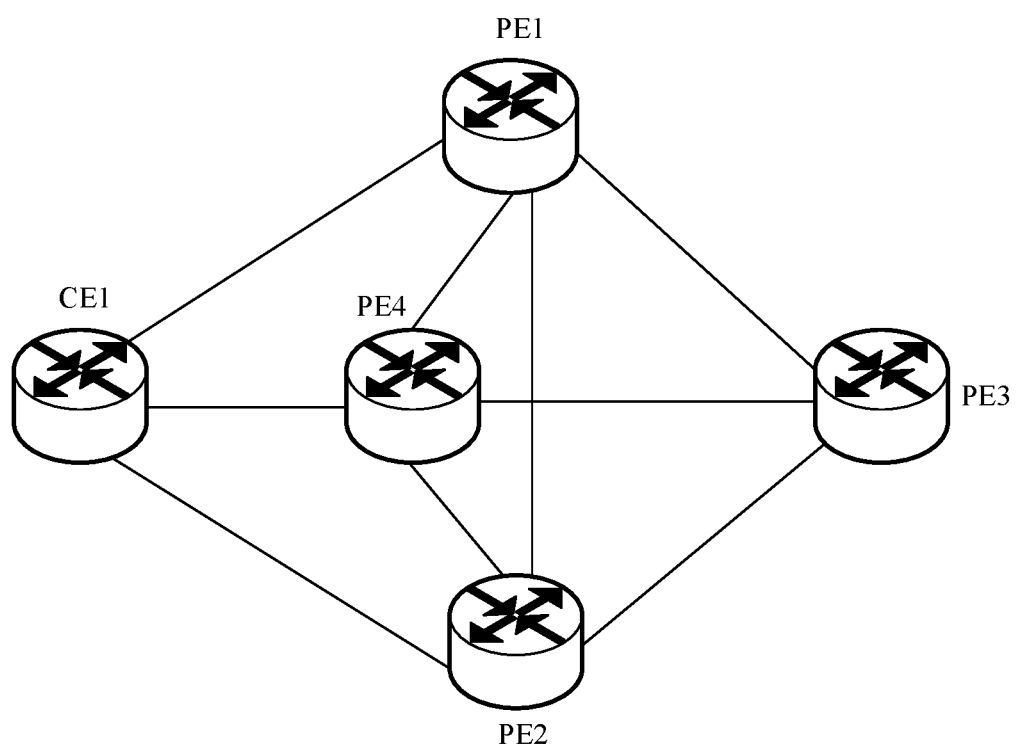
FIG. 4 is a schematic diagram of another network system, according to an embodiment of this application.

The case where the CE1 device is dual-homed to the PE1 device and the PE2 device is explained above. In actual application, the CE1 device may be multi-homed to at least three PE devices. As shown in FIG. 4, the CE1 device is triple-homed to the PE1 device, the PE2 device, and a PE4 device. The PE3 device is a peer of the PE1 device, the PE2 device, and the PE4 device.

In this case, operations performed by any one of the at least three PE devices are similar to the operations performed by the PE1 device or the PE2 device. Details are not described again in this embodiment of this application. When a fault occurs in a connection between any one of the at least three PE devices and the CE1 device, if the PE3 device receives a route withdrawal message sent by any PE device in the at least three PE devices, the PE3 device may not use a common address of the at least three PE devices to forward a packet, but use an address of one or more PE devices other than the PE device in the at least three PE devices to send the packet to the CE1 device, for example, an IP address of the one or more other PE devices is used as a next-hop address. Alternatively, if the PE3 device receives updated route information sent by any PE device in the at least three PE devices, the PE3 device does not use the common address of the at least three PE devices to forward the packet, but uses the address of one or more PE devices other than the foregoing PE device whose connection is faulty as the next-hop address to send the packet to the CE1 device, where the updated route information is generated by the any PE device based on the route withdrawal message sent by another multi-homing PE device. Any one of the at least three PE devices may establish local forwarding information base entries based on the received route information sent by another multi-homing PE device, where the local forwarding information base entries may include one or more backup next-hop addresses. When a fault occurs in a connection between any one of the at least three PE devices and the CE1 device, other PE devices may update the local forwarding information base entries based on the received route withdrawal message sent by the any PE device.

For ease of understanding, the following explains the foregoing method by using examples with reference to network systems shown in FIG. 5 to FIG. 8. It is assumed that an address of the CE1 device is 1.1.1.1, an address of the PE1 device is 10.1.1.1, an address of the PE2 device is 10.1.1.2, and a common address of the PE1 device and the PE2 device is 9.9.9.9. A port address of CE1 and PE1 is 192.168.1.1, and a port address of CE1 and PE2 is 192.168.1.2.

Figure 5:
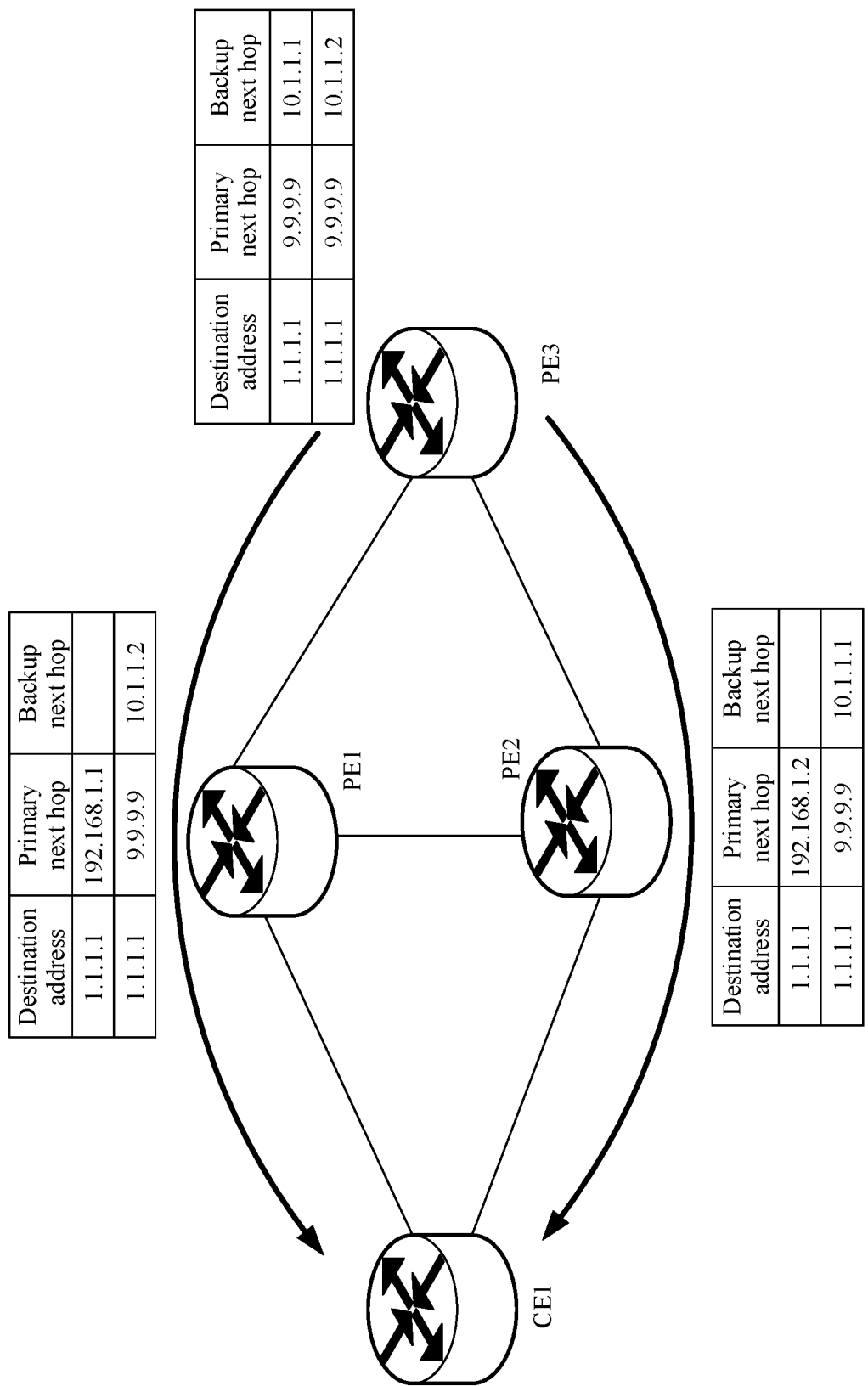
FIG. 5 is a schematic diagram of another network system, according to an embodiment of this application.
Figure 6:
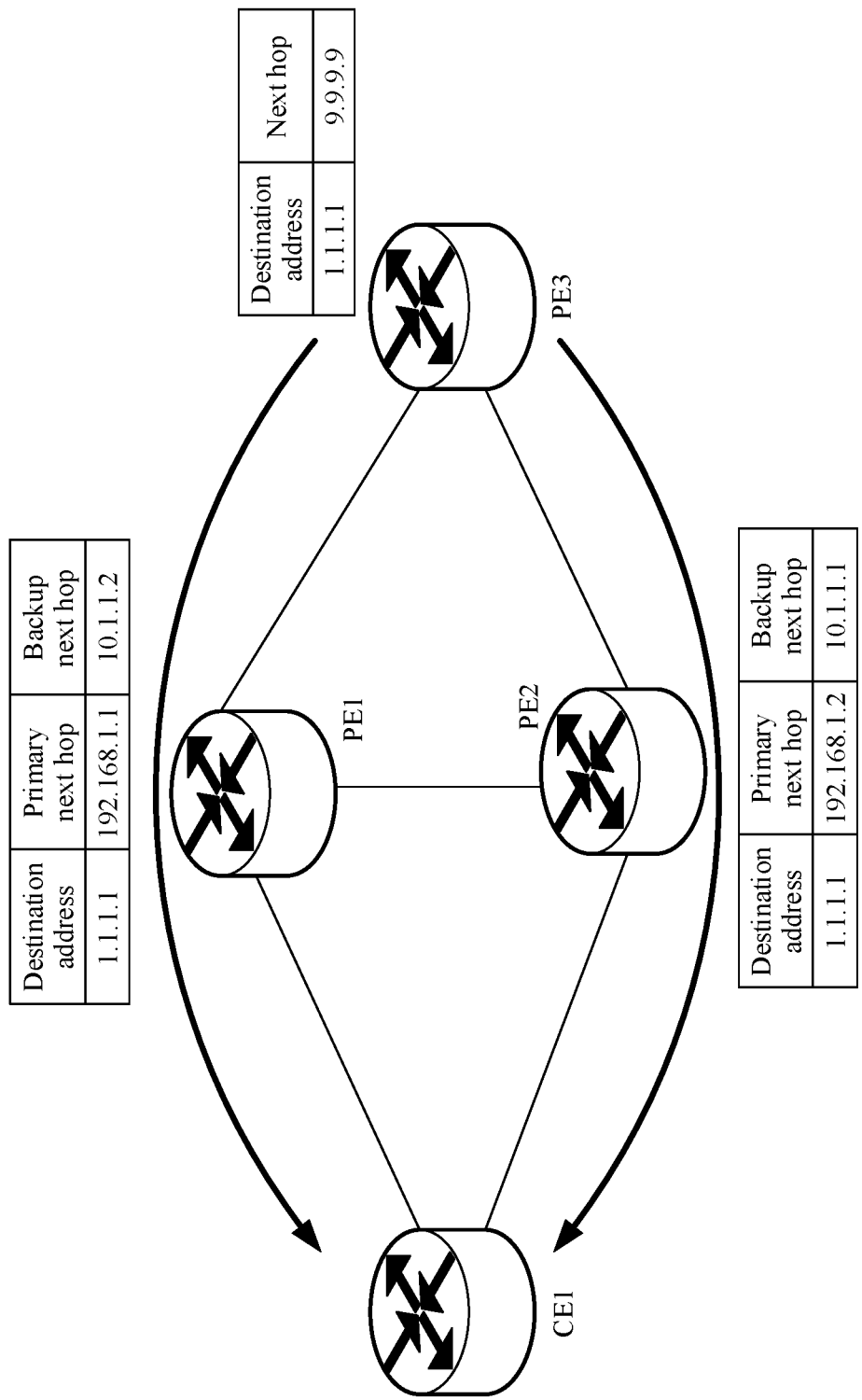
FIG. 6 is a schematic diagram of another network system, according to an embodiment of this application.

In a normal state, the PE1 device sends first route information of the CE1 device, and the PE2 device sends second route information of the CE1 device. The PE1 device may perform route learning after receiving the second route information, the PE2 device may perform route learning after receiving the first route information, and the PE3 device may perform route learning after receiving the first route information and the second route information. For example, routes learned by the PE1 device, the PE2 device, and the PE3 device are shown in FIG. 5, and forwarding information base entries generated by the PE1 device, the PE2 device, and the PE3 device according to the routes learned by the PE1 device, the PE2 device, and the PE3 device are shown in FIG. 6. Refer to FIG. 6. For example, the PE1 device directly forwards a packet to the CE1 device mainly according to the port address 192.168.1.1, and the address 10.1.1.2 of the PE2 device may be used as an alternative when there is a fault. The PE2 device directly forwards a packet to the CE1 device mainly according to the port address 192.168.1.2, and the address 10.1.1.1 of the PE1 device may be used as an alternative when there is a fault. The PE3 device forwards a packet according to the common address 9.9.9.9 of the PE1 device and the PE2 device.

Figure 7:
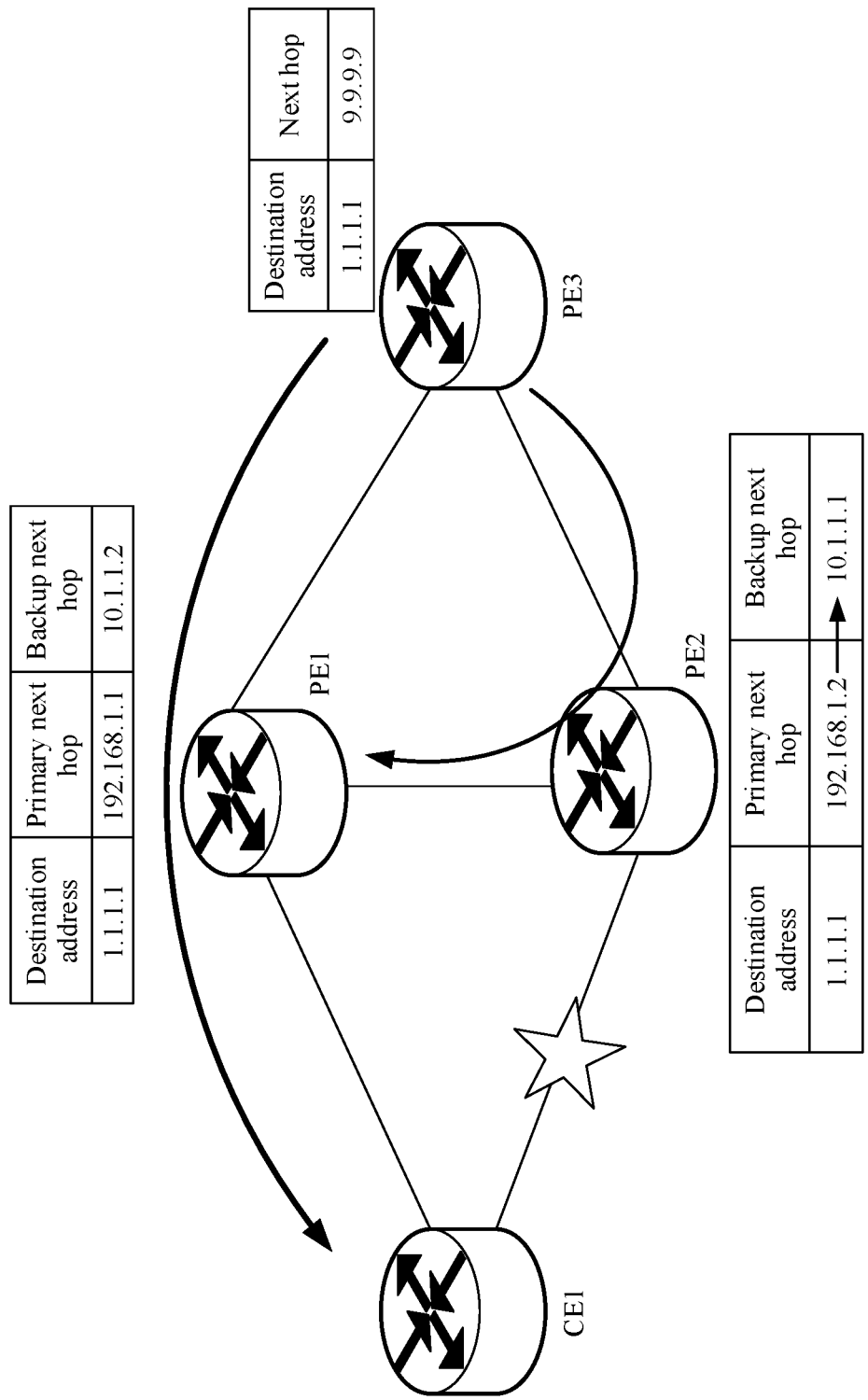
FIG. 7 is a schematic diagram of another network system, according to an embodiment of this application.

For example, as shown in FIG. 7, when a fault occurs in the connection between the PE2 device and the CE1 device, the PE2 device may sense the connection fault. In this case, if the PE2 device receives the packet sent by the PE3 device to the CE1 device, the PE2 device forwards the packet to the PE1 device according to the backup next-hop 10.1.1.1 in the forwarding information base entries of the PE2 device, and the PE1 device forwards the packet to the CE1 device.

Figure 8:
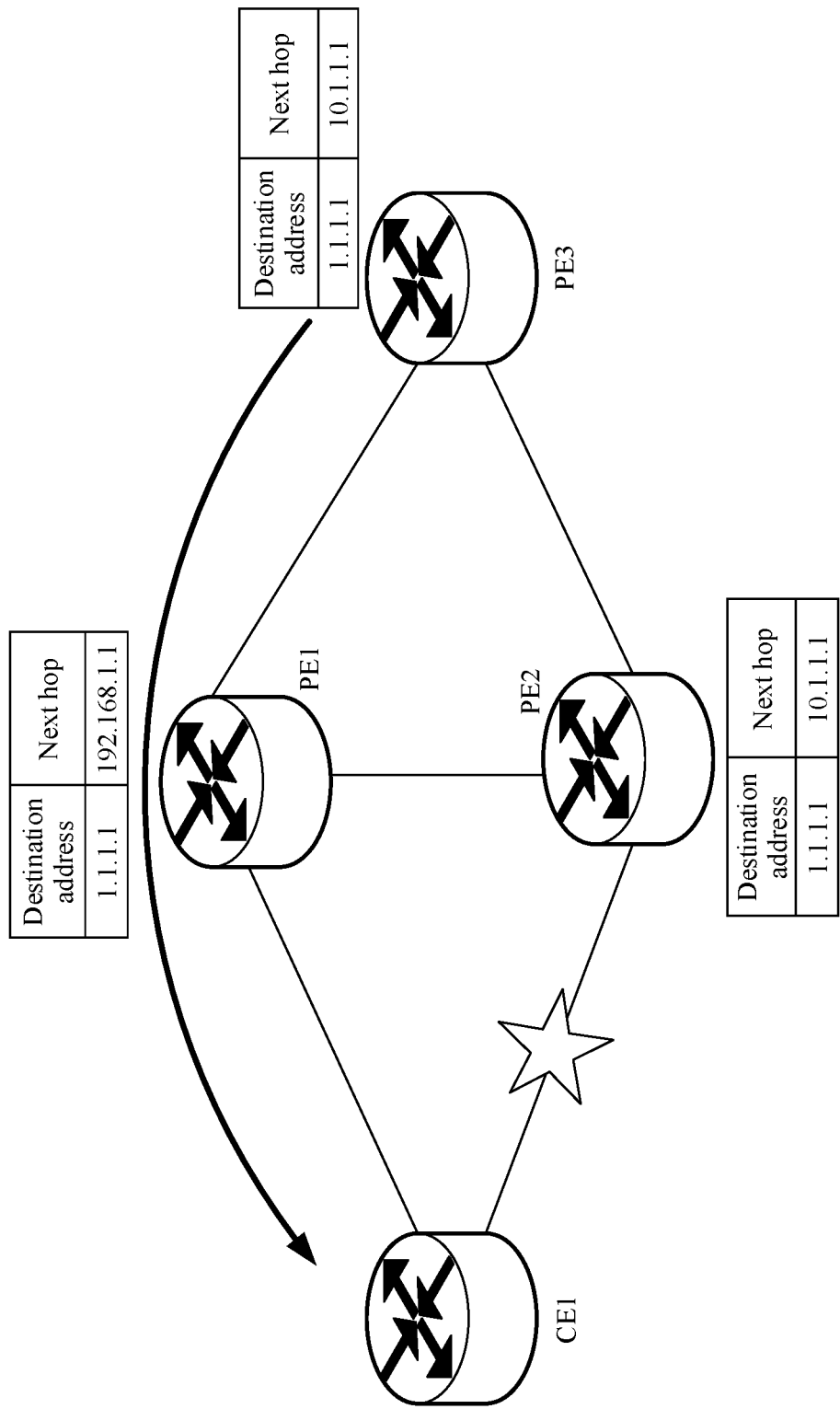
FIG. 8 is a schematic diagram of another network system, according to an embodiment of this application.

After sensing the connection fault, the PE2 device may update the forwarding information base entries of the PE2 device, and may send a route withdrawal message. After receiving the route withdrawal message, the PE1 device updates the forwarding information base entries of the PE1, and sends third routing message simultaneously. The third routing message is used to indicate that the common address 9.9.9.9 used as a primary next-hop is no longer available. After receiving the route withdrawal message or the third route information, the PE3 device may update the forwarding information base entries of the PE3 device. Updated forwarding information base entries of the PE1 device, the PE2 device, and the PE3 device are shown in FIG. 8. Refer to FIG. 8. The PE2 device forwards a packet according to the address 10.1.1.1 of the PE1 device. The PE1 device forwards a packet according to the port address 1.1.1.1. The PE3 device forwards a packet according to the address 10.1.1.1 of the PE1 device.

It may be understood that FIG. 5 to FIG. 8 are examples, and are mainly used to present key information that can implement the method provided in embodiments of this application. In actual application, a specific manner in which each PE device generates a routing table and a forwarding table that are used for packet forwarding, and specific content and composition of the routing table and the forwarding table may be designed based on a specific application scenario.

The route sending method and the route processing method provided in embodiments of this application are applied to a network system. The network system includes a first network device and a second network device that are connected to a destination network device, and may include a third network device.

The following describes a process in which the first network device sends a route.

FIG. 9 is a flowchart of a route sending method according to an embodiment of this application. The method may be performed by the first network device, and the first network device may be, for example, the PE1 device in FIG. 1 to FIG. 3. Refer to FIG. 9. The method includes the following steps.

901: The first network device sends first route information of a destination network device, where the first route information includes a first destination address, a first primary next-hop address, and a first backup next-hop address, the first destination address includes an address of the destination network device, the first primary next-hop address includes a common address of the first network device and the second network device, and the first backup next-hop address includes an address of the first network device.

Because the destination network device is dual-homed to the first network device and the second network device, the first network device and the second network device, as a pair of dual-homing network devices, may be deployed with the common address, where the common address may be a loopback address. A type of a backup next-hop address may be an IP address, that is, the first backup next-hop address may be an IP address of the first network device. In other cases, a type of the common address or the type of the backup next-hop address may alternatively be another address type. The type of the common address may be different from the type of the backup next-hop address. Alternatively, in some cases, the type of the common address may be the same as the type of the backup next-hop address, but the two types can be distinguished between in a specific manner, for example, specific content or values are different, or distinguishing identifiers are different. The address of the destination network device may be an IP address of the destination network device.

In this embodiment of this application, a destination address in the first route information of the destination network device is a first destination address (that is, the address of the destination network device), and a next-hop address in the first route information includes the first primary next-hop address (that is, the common address of the first network device and the second network device), and also includes the first backup next-hop address (that is, the address of the first network device). In this way, another network device that receives the first route information may store the common address of the first network device and the second network device, and may further store the address of the first network device, so that the another network device can directly forward a packet according to the first backup next-hop address when a fault occurs in a connection between the second network device and the destination network device.

In a possible case, the first route information may be carried in one route or two routes for sending. For details, refer to the related description in 201 about the manner of carrying the first route information. Details are not described herein again.

When sending the first route information of the destination network device, the first network device may send the first route information of the destination network device to a peer of the first network device, for example, may send the first route information of the destination network device to the second network device and a third network device that are peers of the first network device.

Optionally, the first network device may further receive the second route information of the destination network device from the second network device, and then generate forwarding information base entries.

The second route information includes a second destination address, a second primary next-hop address, and a second backup next-hop address, the second destination address includes the address of the destination network device, the second primary next-hop address includes the common address, and the second backup next-hop address includes an address of the second network device.

In a possible case, the second route information may be carried in one route or two routes for sending. For details, refer to the related description in 203 about the manner of carrying the second route information. Details are not described herein again.

A destination address in the forwarding information base entries is the address of the destination network device, and a backup next-hop in the forwarding information base entries is the second backup next-hop address.

In a layer 3 forwarding scenario, after receiving the second route information of the destination network device from the second network device, the first network device may determine that the first network device is in a dual-homing relationship with the second network device, that is, may determine that the destination network device is dual-homed to the first network device and the second network device. In a layer 2 forwarding scenario, when the first network device and the second network device have a same ESI, the first network device may determine that the first network device and the second network device are in a dual-homing relationship.

When determining that the first network device is in the dual-homing relationship with the second network device, the first network device may directly generate the forwarding information base entries according to the second backup next-hop address in the second route information of the destination network device sent by the second network device, that is, may directly generate the forwarding information base entries according to the address of the second network device. To be specific, the destination address in the forwarding information base entries is the address of the destination network device, a primary next-hop in the forwarding information base entries is the address of the destination network device, and a backup next-hop in the forwarding information base entries is the address of the second network device. The forwarding information base entries may be used to guide packet forwarding when a fault occurs on a link between the destination network device and the first network device, where the forwarding information base entries can be FRR entries.

In this embodiment of this application, if a fault occurs in a connection between the first network device and the destination network device, the first network device may directly forward, according to the backup next-hop address in the forwarding information base entries, that is, according to the address of the second network device, a packet that needs to be sent to the destination network device to the second network device, and then the second network device forwards the packet to the destination network device. This ensures normal packet forwarding.

Further, the first network device may further receive, from the second network device, a route withdrawal message used for withdrawing a route of the destination network device, and then send third route information of the destination network device according to the route withdrawal message.

The route withdrawal message is used to indicate that a previously advertised route is unreachable. For the second network device, the route withdrawal message sent by the second network device is used for withdrawing the second route information of the destination network device that is previously sent, that is, indicates that the second route information needs to be deleted.

The third route information includes the first destination address, and the third route information is used to indicate the third network device to use the first backup next-hop address as a next-hop address for reaching the destination network device. In other words, the third route information may carry the first backup next-hop address, that is, the address of the first network device. For a specific manner of carrying the third route information, refer to the related description in 302. Details are not described herein again.

After receiving the route withdrawal message from the second network device, the first network device may determine that the dual-homing relationship between the first network device and the second network device no longer exists. In this case, the first network device may update a route advertised by the first network device, that is, may send the third route information of the destination network device.

Because the second backup next-hop address in the local forwarding information base entries of the first network devices is generated based on the second route information of the destination network device sent by the second network device, after receiving the route withdrawal message sent by the second network device, the first network device may further delete the forwarding information base entries based on the route withdrawal message, for example, the second backup next-hop address in the FRR forwarding information base entries.

After the first network device sends the first route information or the third route information to the third network device, the first network device may receive a packet sent by the third network device to the destination network device. In other words, the first network device may receive a packet that is sent by the third network device and whose destination address is the address of the destination network device. Then the first network device may forward the packet according to the local forwarding information base entries.

The following describes a process in which a second network device process a route.

FIG. 10 is a flowchart of a route processing method according to an embodiment of this application. The method may be performed by the second network device, and the second network device may be, for example, the PE2 device in FIG. 1 to FIG. 3. Refer to FIG. 10. The method includes the following steps.

1001: The second network device receives first route information of a destination network device sent by a first network device, and then generates forwarding information base entries.

A destination address in the forwarding information base entries generated by the second network device is an address of the destination network device, and a backup next-hop in the forwarding information base entries is a first backup next-hop address.

In a layer 3 forwarding scenario, after receiving first route information of the destination network device from the first network device, the second network device may determine that the second network device is in a dual-homing relationship with the first network device, that is, may determine that the destination network device is dual-homed to the second network device and the first network device. In a layer 2 forwarding scenario, when the second network device and the first network device have a same ESI, the second network device may determine that the second network device and the first network device are in a dual-homing relationship.

When determining that the second network device is in the dual-homing relationship with the first network device, the second network device may directly generate the forwarding information base entries according to the first backup next-hop address in the first route information of the destination network device sent by the first network device, that is, may directly generate the forwarding information base entries according to an address of the first network device. To be specific, the destination address in the forwarding information base entries is the address of the destination network device, a primary next-hop in the forwarding information base entries is the address of the destination network device, and a backup next-hop in the forwarding information base entries is the address of the first network device. The forwarding information base entries may be used to guide packet forwarding when a fault occurs on a link between the destination network device and the second network device, where the forwarding information base entries can be FRR entries.

In this embodiment of this application, if a fault occurs in the connection between the second network device and the destination network device, the second network device may directly forward, according to the backup next-hop address in the forwarding information base entries, that is, according to the address of the first network device, a packet that needs to be sent to the destination network device to the first network device, and then the first network device forwards the packet to the destination network device. This ensures normal packet forwarding.

Optionally, the second network device may send second route information of the destination network device, and may specifically send the second route information of the destination network device to a peer of the second network device. The second network device may send the second route information of the destination network device to the first network device and a third network device.

In a possible case, the second route information may be carried in one route or two routes for sending. For details, refer to the related description in 203 about the manner of carrying the second route information. Details are not described herein again.

Further, because a fault occurs in the connection between the second network device and the destination network device, the second network device may further send a route withdrawal message used for withdrawing a route of the destination network device to the first network device and the third network device.

The route withdrawal message is used to indicate that a previously advertised route is unreachable. For the second network device, the route withdrawal message sent by the second network device is used for withdrawing the second route information of the destination network device that is previously sent, that is, indicates that the second route information needs to be deleted.

The fault in the connection between the second network device and the destination network device may include an interface fault of the second network device, a fault on a link between the second network device and the destination network device, and the like. When a fault occurs in the connection between the second network device and the destination network device, a packet transmission path between the second network device and the destination network device is faulty. Therefore, the second network device may send the route withdrawal message to withdraw the second route information that is previously sent.

In addition, when a fault occurs in the connection between the second network device and the destination network device, if the second network device receives a packet sent by the third network device to the destination network device, the second network device may forward the packet to the first network device according to the backup next-hop in the local forwarding information base entries. Then the first network device forwards the packet to the destination network device. In this way, normal forwarding of the packet can be ensured.

The following describes a process in which a third network device process a route.

FIG. 11 is a flowchart of a route processing method according to an embodiment of this application. The method may be performed by the third network device, and the third network device may be, for example, the PE3 device in FIG. 1 to FIG. 3. Refer to FIG. 11. The method includes the following steps.

1101. The third network device receives first route information of a destination network device from a first network device, and receives second route information of the destination network device from a second network device.

In a possible case, the first route information may be carried in one route or two routes for sending. For details, refer to the related description in 201 about the manner of carrying the first route information. Details are not described herein again.

In a possible case, the second route information may be carried in one route or two routes for sending. For details, refer to the related description in 203 about the manner of carrying the second route information. Details are not described herein again.

1102: The third network device sends, based on the received first route information and the received second route information, a first packet to the destination network device by using a common address of the first network device and the second network device as a next-hop address.

Because both the first route information and the second route information are route information of the destination network device, the third network device determines that two routes of the destination network device are received. In this case, for the first packet that needs to be sent to the destination network device, the third network device may send the first packet to the destination network device by using the common address as a next-hop address.

To be specific, the third network device may generate forwarding information base entries in the third network device based on the received first route information and the received second route information. A destination address in the forwarding information base entries in the third network device is an address of the destination network device, and a next-hop is the common address. The third network device sends the first packet to the destination network device according to the next-hop in the forwarding information base entries. To be specific, the third network device may use the common address as a next-hop forwarding information base entry used for querying, and send the first packet to the destination network device according to the forwarding information base entry; or the third network device may use the common address as a next-hop recursive tunnel, and send the first packet to the destination network device according to tunnel information of the tunnel. In this case, the third network device sends the first packet to the first network device or the second network device according to a load balancing policy, and the first network device or the second network device forwards the first packet to the destination network device.

In this embodiment of this application, the third network device may receive the first route information of the destination network device sent by the first network device, and receive the second route information of the destination network device sent by the second network device. Destination addresses in both the first route information and the second route information are the address of the destination network device. A next-hop address in the first route information may include the common address, and may further include an address of the first network device. A next-hop address in the second route information may include the common address, and may further include an address of the second network device. In this way, the third network device may store the common address and the addresses of the first network device and the second network device. Therefore, when a fault occurs in the connection between one of the first network device and the second network device and the destination network device, the third network device can directly forward the packet based on the address of the other network device.

A fault in the connection between the second network device and the destination network device results in the following two situations.

First situation: The third network device receives, from the second network device, a route withdrawal message used for withdrawing a route of the destination network device, and sends a second packet to the destination network device based on the route withdrawal message by using the first backup next-hop address.

To be specific, when receiving the route withdrawal message from the second network device, the third network device may update the forwarding information base entries based on the route withdrawal message. The destination address in the forwarding information base entries is the address of the destination network device, and the next-hop in the forwarding information base entries is the address of the first network device, for example, an IP address of the first network device. That is, in this case, the third network device sends the second packet to the destination network device not according to the common address of the first network device and the second network device. In this case, the third network device forwards the second packet to the first network device, and the first network device forwards the second packet to the destination network device.

Second situation: The third network device receives third route information of the destination network device from the first network device, and sends a second packet to the destination network device based on the third route information by using the first backup next-hop address.

To be specific, when receiving the third route information of the destination network device from the first network device, the third network device may update the forwarding information base entries based on the third route information. The destination address in the forwarding information base entries is the address of the destination network device, and the next-hop in the forwarding information base entries is the address of the first network device. Similar to the first situation, the third network device forwards the second packet to the first network device, and the first network device forwards the second packet to the destination network device.

It should be noted that, in some cases, the third network device has a route learning capability but does not have a route withdrawal capability. When the third network device does not have the route withdrawal capability, the third network device may implement packet forwarding according to the foregoing second situation. When the third network device has the route withdrawal capability, the third network device may implement packet forwarding according to the method described in either of the first situation or the second situation. In addition, when the third network device updates the forwarding information base entries based on the received route withdrawal message or the received third route information, one possible manner is to replace the common address in the next-hop information with the first backup next-hop address; and another possible manner is to update a flag to indicate that the common address in the next-hop information is currently unavailable, and the first backup next-hop address needs to be used to forward the packet.

Figure 12:
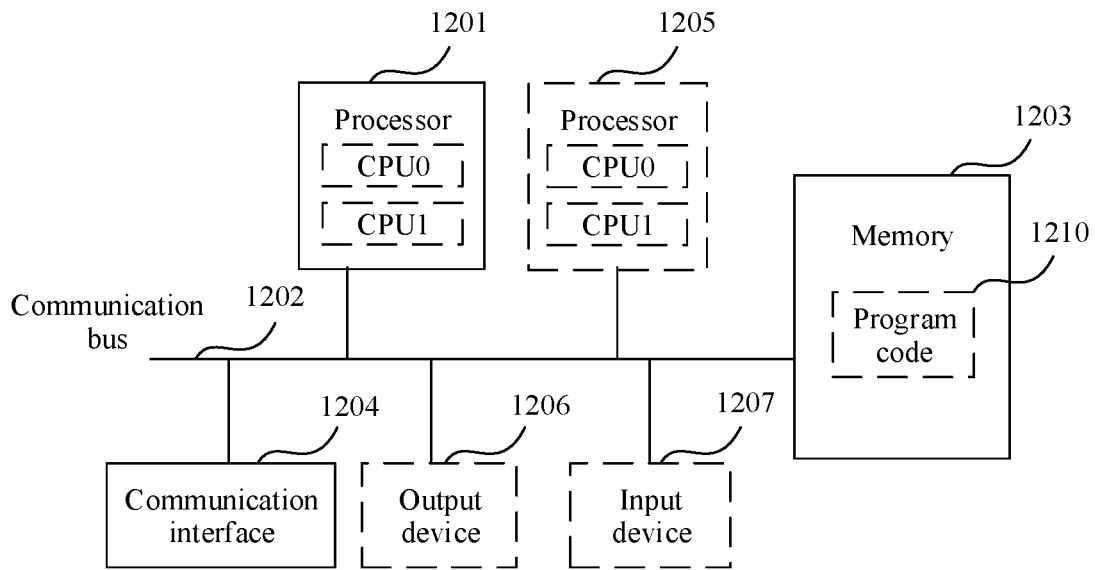
FIG. 12 is a schematic diagram of a structure of a network device, according to an embodiment of this application.

FIG. 12 is a schematic diagram of a structure of a network device according to an embodiment of this application. The network device may be the PE1 device, the PE2 device, or the PE3 device shown in the embodiments in FIG. 1 to FIG. 3, or may be the first network device, the second network device, or the third network device described in the embodiments in FIG. 9 to FIG. 11. Refer to FIG. 12. The network device may include at least one processor 1201 and at least one communication interface 1204. The network device may further include a communication bus 1202 and a memory 1203.

The processor 1201 may be a microprocessor (including a central processing unit (CPU) or the like), an application-specific integrated circuit (ASIC), or one or more integrated circuits configured to control program execution of the solutions of this application.

The communication interface 1204 uses any apparatus such as a transceiver to communicate with another device or communication network, such as the Ethernet, a radio access network (RAN), or a wireless local area network (WLAN).

The memory 1203 may be a read-only memory (ROM), a random access memory (RAM), an electrically erasable programmable read-only memory (EEPROM), an optical disc (including a compact disc read-only memory (CD-ROM), a compact disc, a laser disc, a digital versatile disc, a Blu-ray disc, and the like), a magnetic disk storage medium, another magnetic storage device, or any other medium that can be used to carry or store expected program code in a form of an instruction or a data structure and that can be accessed by a computer, but the memory 1203 is not limited thereto. The memory 1203 may exist independently, and is connected to the processor 1201 through the communication bus 1202. The memory 1203 may be alternatively integrated with the processor 1201.

The communication bus 1202 may include a path, to transmit information between the foregoing components.

In a specific implementation, in an embodiment, the processor 1201 may include one or more CPUs, for example, a CPU0 and a CPU1 shown in FIG. 12.

In a specific implementation, in an embodiment, the network device may include a plurality of processors, for example, the processor 1201 and a processor 1205 shown in FIG. 12. Each of the processors may be a single-core processor, or may be a multi-core processor. The processor herein may be one or more devices, circuits, and/or processing cores configured to process data (for example, computer program instructions).

In a specific implementation, in an embodiment, the network device may further include an output device 1206 and an input device 1207. The output device 1206 communicates with the processor 1201, and may display information in a plurality of manners. For example, the output device 1206 may be a liquid crystal display (LCD), a light emitting diode (LED) display device, a cathode ray tube (CRT) display device, or a projector (projector). The input device 1207 communicates with the processor 1201, and can receive an input from a user in a plurality of manners. For example, the input device 1207 may be a mouse, a keyboard, a touchscreen device, or a sensor device.

The network device may be, for example, a router, a switch, a PE device, a network server, or a desktop computer, or may be another type of communication device or embedded device. A type of the network device is not specifically limited in embodiments of this application.

When the network device includes the memory 1203, the memory 1203 is configured to store program code 1210 used for executing the solutions of this application, and the processor 1201 is configured to execute the program code 1210 stored in the memory 1203. The network device may implement, by using the processor 1201 and the program code 1210 in the memory 1203, the operations performed by the first network device, the second network device, or the third network device in the foregoing embodiments. In another implementation, alternatively, the memory may exist independently of the network device. When running, the network device may invoke the program code stored in the memory, to implement the operations performed by the first network device, the second network device, or the third network device in the foregoing embodiments.

Figure 13:
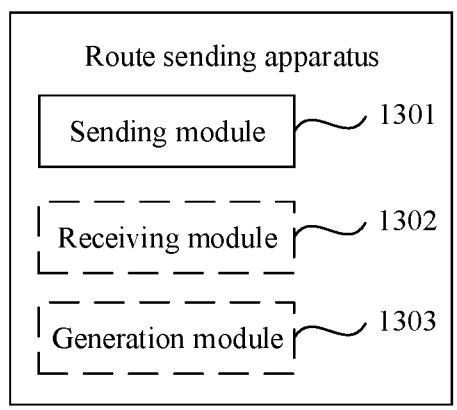
FIG. 13 is a schematic diagram of a structure of a route sending apparatus, according to an embodiment of this application.

FIG. 13 is a schematic diagram of a structure of a route sending apparatus according to an embodiment of this application. The apparatus may be implemented as a part of a first network device or the entire first network device by using software, hardware, or a combination thereof. The first network device may be the network device shown in FIG. 12. Refer to FIG. 13. The apparatus includes:

a sending module 1301, configured to send first route information of a destination network device, where the first route information includes a first destination address, a first primary next-hop address, and a first backup next-hop address, the first destination address includes an address of the destination network device, the first primary next-hop address includes a common address of the first network device and the second network device, and the first backup next-hop address includes an address of the first network device.

Optionally, the first primary next-hop address is carried in a first attribute field in a first BGP route, and the first backup next-hop address is carried in a second attribute field in the first BGP route.

Optionally, the sending module 1301 is configured to:
send the first route information of the destination network device to the second network device and a third network device.

Optionally, the apparatus includes: a receiving module 1302, configured to receive second route information of the destination network device from the second network device, where the second route information includes a second destination address, a second primary next-hop address, and a second backup next-hop address, the second destination address includes the address of the destination network device, the second primary next-hop address includes the common address, and the second backup next-hop address includes an address of the second network device; and a generation module 1303, configured to generate forwarding information base entries, where a destination address in the forwarding information base entries is the address of the destination network device, and a backup next-hop in the forwarding information base entries is the second backup next-hop address.

Optionally, the apparatus further includes:
the receiving module 1302, configured to receive, from the second network device, a route withdrawal message used for withdrawing a route of the destination network device;
and the sending module 1301, further configured to send third route information of the destination network device based on the route withdrawal message, where the third route information includes the first destination address, and the third route information is used to indicate the third network device to use the first backup next-hop address as a next-hop address for reaching the destination network device.

Optionally, the third route information includes the first backup next-hop address, and the first backup next-hop address is carried in a next-hop field of the third route information.

Optionally, the apparatus includes:
the receiving module 1302, configured to: after the first route information is sent to the third network device, receive a packet sent by the third network device to the destination network device.

Optionally, the address of the first network device is an IP address of the first network device, and the common address is a loopback address.

In this embodiment of this application, a destination address in the first route information of the destination network device is the first destination address (that is, the address of the destination network device), and a next-hop address in the first route information includes the first primary next-hop address (that is, the common address of the first network device and the second network device), and also includes the first backup next-hop address (that is, the address of the first network device). In this way, another network device that receives the first route information may store the common address of the first network device and the second network device, and may further store the address of the first network device, so that the another network device can directly forward a packet according to the first backup next-hop address when a fault occurs in a connection between the second network device and the destination network device.

It should be noted that when the route sending apparatus provided in the foregoing embodiments sends a route, division of the foregoing functional modules is used only as an example for description. In actual application, the foregoing functions may be completed by different functional modules based on a requirement. In other words, an internal structure of the apparatus is divided into different functional modules to complete all or some of the described functions. In addition, the route sending apparatus provided in the foregoing embodiments and the route sending method embodiments are based on a same concept. For a specific implementation process of the route sending apparatus, refer to the method embodiments. Details are not described herein again.

Figure 14:
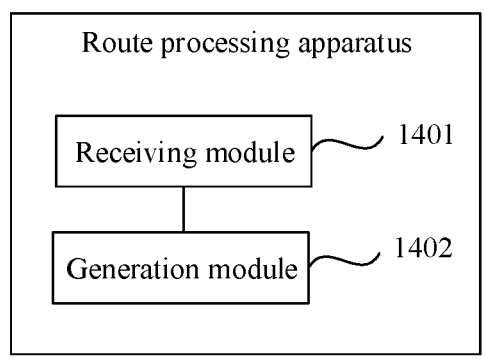
FIG. 14 is a schematic diagram of a structure of a route processing apparatus, according to an embodiment of this application.

FIG. 14 is a schematic diagram of a structure of a route processing apparatus according to an embodiment of this application. The apparatus may be implemented as a part of a second network device or the entire second network device by using software, hardware, or a combination thereof. The second network device may be the network device shown in FIG. 12. Refer to FIG. 14. The apparatus includes:

a receiving module 1401, configured to receive first route information of a destination network device sent by a first network device, where the first route information includes a first destination address, a first primary next-hop address, and a first backup next-hop address, the first destination address includes an address of the destination network device, the first primary next-hop address includes a common address of the first network device and a second network device, and the first backup next-hop address includes an address of the first network device; and a generation module 1402, configured to generate forwarding information base entries, where a destination address in the forwarding information base entries is the address of the destination network device, and a backup next-hop in the forwarding information base entries is the first backup next-hop address.

Optionally, the apparatus includes:

a sending module, configured to send a route withdrawal message used for withdrawing a route of the destination network device to the first network device and a third network device due to a fault in a connection between the second network device and the destination network device.

Optionally, the apparatus further includes a sending module.

The receiving module 1401 is further configured to receive a packet sent by the third network device to the destination network device.

The sending module is configured to: when a fault occurs in the connection between the second network device and the destination network device, forward the packet to the first network device according to the backup next-hop in the forwarding information base entries.

Optionally, the apparatus includes:

the sending module, configured to send second route information, where the second route information includes a second destination address, a second primary next-hop address, and a second backup next-hop address, the second destination address includes the address of the destination network device, the second primary next-hop address includes the common address, and the second backup next-hop address includes an address of the second network device.

In this embodiment of this application, if a fault occurs in the connection between the second network device and the destination network device, the second network device may directly forward, according to the backup next-hop address in the forwarding information base entries, that is, according to the address of the first network device, a packet that needs to be sent to the destination network device to the first network device, and then the first network device forwards the packet to the destination network device. This ensures normal packet forwarding.

Figure 15:
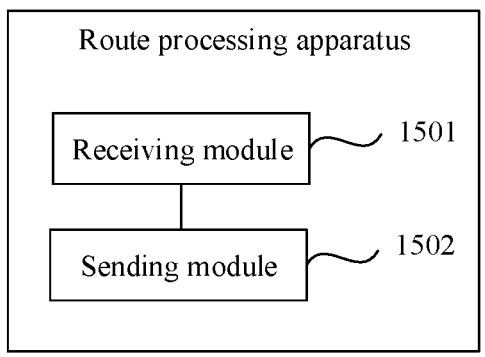
FIG. 15 is a schematic diagram of a structure of another route processing apparatus, according to an embodiment of this application.

FIG. 15 is a schematic diagram of a structure of a route processing apparatus according to an embodiment of this application. The apparatus may be implemented as a part of a third network device or the entire third network device by using software, hardware, or a combination thereof. The third network device may be the network device shown in FIG. 12. Refer to FIG. 15. The apparatus includes:

a receiving module 1501, configured to receive first route information of a destination network device from a first network device, where the first route information includes a first destination address, a first primary next-hop address, and a first backup next-hop address, the first destination address includes an address of the destination network device, the first primary next-hop address includes a common address of the first network device and a second network device, and the first backup next-hop address includes an address of the first network device; and the receiving module 1501 is further configured to receive second route information of the destination network device from the second network device, where the second route information includes a second destination address, a second primary next-hop address, and a second backup next-hop address, the second destination address includes the address of the destination network device, the second primary next-hop address includes the common address, and the second backup next-hop address includes an address of the second network device; and a sending module 1502, configured to send, based on the received first route information and the received second route information, a first packet to the destination network device by using the common address as a next-hop address.

Optionally, the common address is carried in a first attribute field in a first BGP route sent by the first network device and a third attribute field in a second BGP route sent by the second network device, the address of the first network device is carried in a second attribute field of the first BGP route, and the address of the second network device is carried in a fourth attribute field of the second BGP route.

Optionally, the receiving module 1501 is further configured to receive, from the second network device, a route withdrawal message used for withdrawing a route of the destination network device; and the sending module 1502 is further configured to send a second packet to the destination network device based on the route withdrawal message by using the first backup next-hop address.

Optionally, the receiving module 1501 is further configured to receive third route information of the destination network device from the first network device, where the third route information is used to indicate a third network device to use the first backup next-hop address as a next-hop address for reaching the destination network device; and the sending module 1502 is further configured to send a second packet to the destination network device based on the third route information by using the first backup next-hop address.

Optionally, the sending module 1502 is configured to:

use the common address as a next-hop forwarding information base entry used for querying, and send the first packet to the destination network device according to the forwarding information base entry; or use the common address as a next-hop recursive tunnel, and send the first packet to the destination network device based on tunnel information of the tunnel.

Optionally, the first backup next-hop address is an IP address of the first network device, and the common address is a loopback address.

In this embodiment of this application, the third network device may receive the first route information of the destination network device sent by the first network device, and receive the second route information of the destination network device sent by the second network device. Destination addresses in both the first route information and the second route information are the address of the destination network device. A next-hop address in the first route information may include the common address, and may further include the address of the first network device. A next-hop address in the second route information may include the common address, and may further include an address of the second network device. In this way, the third network device may store the common address and the addresses of the first network device and the second network device. Therefore, when a fault occurs in a connection between one of the first network device and the second network device and the destination network device, the third network device can directly forward the packet according to the address of the other network device.

It should be noted that when the route processing apparatus provided in the foregoing embodiments processes a route, division of the foregoing functional modules is used only as an example for description. In actual application, the foregoing functions may be completed by different functional modules based on a requirement. In other words, an internal structure of the apparatus is divided into different functional modules to complete all or some of the described functions. In addition, the route processing apparatus provided in the foregoing embodiments and the route processing method embodiments are based on a same concept. For a specific implementation process of the route processing apparatus, refer to the method embodiments. Details are not described herein again.

Figure 16:
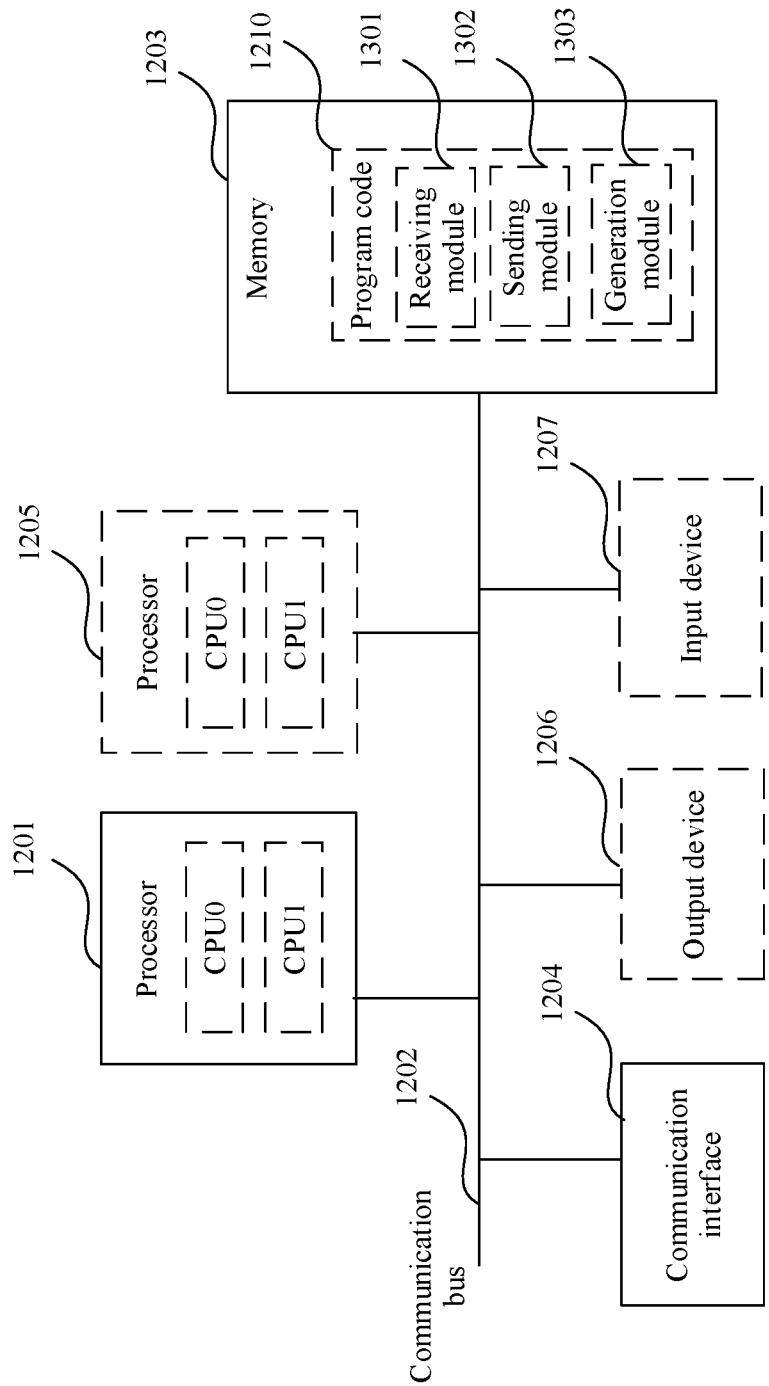
FIG. 16 is a schematic diagram of a structure of another network device, according to an embodiment of this application.

FIG. 16 shows a network device including the route sending apparatus provided in FIG. 13. In an implementation, as shown in FIG. 16, the route sending apparatus is in a form of a software module. The memory 1203 may store program code and data, and the program code may be divided into different program modules based on function implementation. For example, the program code and the data may be invoked and executed by the processor 1201 and/or the processor 1205, to implement functions of the receiving module 1301, the sending module 1302, and/or the generation module 1303. The network device further includes the communication interface 1204. In another implementation, the memory may include a program module in a software form. The program module may be invoked by the processor to implement functions of the generation module 1303, for example, generating forwarding information base entries and generating route information. Functions of the receiving module 1301 and/or the sending module 1302 may be executed by the communication interface 1204 or a transceiver. The receiving module 1301 and/or the sending module 1302 may be configured to send a locally generated route, and may also be configured to receive a route, a packet, or the like sent by another device.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer instructions are loaded and executed on a computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired manner (for example, a coaxial cable, an optical fiber, or a digital subscriber line (DSL)) or a wireless manner (for example, infrared, radio, and microwave, or the like). The computer-readable storage medium may be any usable medium accessible by a computer, or a data storage device, such as a server or a data center, integrating one or more usable media. The usable medium may be a magnetic medium (for example, a floppy disk, a hard disk drive, or a magnetic tape), an optical medium (for example, a digital versatile disc (DVD)), a semiconductor medium (for example, a solid-state disk (SSD)), or the like.

A person skilled in the art should be aware that in the foregoing one or more examples, functions described in this application may be implemented by hardware, software, firmware, or any combination thereof. When the functions are implemented by software, the functions may be stored in a computer-readable medium or transmitted as one or more instructions or code in a computer-readable medium. The computer-readable medium includes a computer storage medium and a communication medium, where the communication medium includes any medium that enables a computer program to be transmitted from one place to another. The storage medium may be any available medium accessible to a general-purpose or a dedicated computer.

It should be understood that sequence numbers of the foregoing processes do not mean execution sequences in embodiments of this application. The execution sequences of the processes should be determined based on functions and internal logic of the processes, and should not limit the implementation processes of embodiments of this application to the implementation processes described above.

The foregoing descriptions are merely embodiments of this application, but are not intended to limit this application. Any modification, equivalent replacement, or improvement made without departing from the spirit and principle of this application should fall within the protection scope of this application.

What is claimed is:

1. A first network device, comprising:
a memory configured to store instructions; and
a processor coupled to the memory, wherein in response to the instructions being executed by the processor, the instructions cause the first network device to:
send first route information of a destination network device to a third network device, wherein the destination network device is connected to the first network device and a second network device, the first network device and the second network device are deployed with a common address, and wherein the first route information comprises a first destination address, a first primary next-hop address to the first destination address, and a first backup next-hop address to the first destination address, wherein the first destination address comprises an address of the destination network device, wherein the first primary next-hop address comprises the common address of the first network device and the second network device, and wherein the first backup next-hop address comprises an address of the first network device that is different from the common address of the first network device and the second network device.

2. The first network device according to claim 1, wherein the first primary next-hop address is carried in a first attribute field in a first Border Gateway Protocol (BGP) route and the first backup next-hop address is carried in a second attribute field in the first BGP route.

3. The first network device according to claim 1, wherein the instructions executed by the processor further cause the first network device to:
send the first route information of the destination network device to the second network device.

4. The first network device according to claim 1, wherein the instructions executed by the processor further cause the first network device to:
receive second route information of the destination network device from the second network device, wherein the second route information comprises a second destination address, a second primary next-hop address to the second destination address, and a second backup next-hop address to the second destination address, wherein the second destination address comprises the address of the destination network device, wherein the second primary next-hop address comprises the common address, and wherein the second backup next-hop address comprises an address of the second network device that is different from the common address of the first network device and the second network device; and
generate forwarding information base entries, wherein a destination address in the forwarding information base entries is the address of the destination network device, and a backup next-hop in the forwarding information base entries is the second backup next-hop address.

5. The first network device according to claim 3, wherein the instructions executed by the processor further cause the first network device to:
receive, from the second network device, a route withdrawal message used for withdrawing a route of the destination network device; and
send third route information of the destination network device to the third network device based on the route withdrawal message, wherein the third route information comprises the first destination address, and wherein the third route information is used to indicate the third network device to use the first backup next-hop address of the first route information as a next-hop address for reaching the destination network device.

6. The first network device according to claim 5, wherein the third route information comprises the first backup next-hop address, and wherein the first backup next-hop address is carried in a next-hop field of the third route information.

7. The first network device according to claim 1, wherein the instructions executed by the processor further cause the first network device to:
after the first network device sends the first route information to the third network device, receive a packet sent by the third network device to the destination network device.

8. The first network device according to claim 1, wherein the address of the first network device is an Internet Protocol (IP) address of the first network device and the common address is a loopback address.

9. A third network device, comprising:
a memory configured to store instructions; and
a processor coupled to the memory, wherein in response to the instructions being executed by the processor, the instructions cause the third network device to:
receive first route information of a destination network device from a first network device, wherein the destination network device is connected to the first network device and a second network device, the first network device and the second network device are deployed with a common address, and wherein the first route information comprises a first destination address, a first primary next-hop address to the first destination address, and a first backup next-hop address to the first destination address, wherein the first destination address comprises an address of the destination network device, wherein the first primary next-hop address comprises the common address of the first network device and the second network device, and wherein the first backup next-hop address comprises an address of the first network device which is different from the common address of the first network device and the second network device;
receive second route information of the destination network device from the second network device, wherein the second route information comprises a second destination address, a second primary next-hop address to the second destination address, and a second backup next-hop address to the second destination address, wherein the second destination address comprises the address of the destination network device, wherein the second primary next-hop address comprises the common address, and wherein the second backup next-hop address comprises an address of the second network device that is different from the common address of the first network device and the second network device; and
send, based on the received first route information and the received second route information, a first packet to the destination network device by using the common address as a next-hop address.

10. The third network device according to claim 9, wherein the common address is carried in a first attribute field in a first Border Gateway Protocol (BGP) route sent by the first network device and a third attribute field in a second BGP route sent by the second network device, wherein the address of the first network device is carried in a second attribute field of the first BGP route, and wherein the address of the second network device is carried in a fourth attribute field of the second BGP route.

11. The third network device according to claim 9, wherein the instructions executed by the processor further cause the third network device to:
receive, from the second network device, a route withdrawal message used for withdrawing a route of the destination network device; and
send a second packet to the destination network device based on the route withdrawal message by using the first backup next-hop address of the first route information.

12. The third network device according to claim 9, wherein the instructions executed by the processor further cause the third network device to:
receive third route information of the destination network device from the first network device, wherein the third route information is used to indicate the third network device to use the first backup next-hop address of the first route information as a next-hop address for reaching the destination network device; and
send a second packet to the destination network device based on the third route information by using the first backup next-hop address.

13. The third network device according to claim 9, wherein the instructions executed by the processor further cause the third network device to:

use the common address as a next-hop forwarding information base entry used for querying and send the first packet to the destination network device according to the next-hop forwarding information base entry; or use the common address as a next-hop recursive tunnel and send the first packet to the destination network device based on tunnel information of the next-hop recursive tunnel.

14. The third network device according to claim 9, wherein the first backup next-hop address is an Internet Protocol (IP) address of the first network device and the common address is a loopback address.

15. A second network device, comprising:

a memory configured to store instructions;

a processor coupled to the memory, wherein in response to the instructions being executed by the processor, cause the second network device to:

receive first route information of a destination network device sent by a first network device, wherein the destination network device is connected to the first network device and a second network device, the first network device and the second network device are deployed with a common address, and wherein the first route information comprises a first destination address, a first primary next-hop address to the first destination address, and a first backup next-hop address to the first destination address, wherein the first destination address comprises an address of the destination network device, wherein the first primary next-hop address comprises the common address of the first network device and the second network device, and wherein the first backup next-hop address comprises an address of the first network device that is different from the common address of the first network device and the second network device; and generate forwarding information base entries, wherein a destination address in the forwarding information base entries is the address of the destination network device, and wherein a backup next-hop in the forwarding information base entries is the first backup next-hop address.

16. The second network device according to claim 15, wherein the instructions executed by the processor further cause the second network device to:

send a route withdrawal message used for withdrawing a route of the destination network device to the first network device and a third network device due to a fault in a connection between the second network device and the destination network device.

17. The second network device according to claim 15, wherein the instructions executed by the processor further cause the second network device to:

receive a packet sent by the third network device to the destination network device; and in response to a fault occurring in the connection between the second network device and the destination network device, forward the packet to the first network device according to the backup next-hop in the forwarding information base entries.

18. The second network device according to claim 15, wherein the instructions executed by the processor further cause the second network device to:

send second route information, wherein the second route information comprises a second destination address, a second primary next-hop address, and a second backup next-hop address, wherein the second destination address comprises the address of the destination network device, wherein the second primary next-hop address comprises the common address, and wherein the second backup next-hop address comprises an address of the second network device.

19. The second network device according to claim 16, wherein the instructions executed by the processor further cause the second network device to:

receive a packet sent by the third network device to the destination network device; and in response to a fault occurring in the connection between the second network device and the destination network device, forward the packet to the first network device according to the backup next-hop in the forwarding information base entries.

\* \* \* \* \*